(12) United States Patent
Banik et al.

(10) Patent No.: US 10,284,789 B2
(45) Date of Patent: May 7, 2019

(54) DYNAMIC GENERATION OF IMAGE OF A SCENE BASED ON REMOVAL OF UNDESIRED OBJECT PRESENT IN THE SCENE

(71) Applicant: SONY CORPORATION, Tokyo (JP)

(72) Inventors: Ananya Banik, Bangalore (IN); Madhvesh Sulibhavi, Bangalore (IN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/705,506

(22) Filed: Sep. 15, 2017

(65) Prior Publication Data

US 2019/0089910 A1 Mar. 21, 2019

(51) Int. Cl.
*H04N 5/262* (2006.01)
*H04N 5/232* (2006.01)

(52) U.S. Cl.
CPC ....... *H04N 5/2621* (2013.01); *H04N 5/23206* (2013.01); *H04N 5/23216* (2013.01); *H04N 5/23245* (2013.01); *H04N 5/23293* (2013.01)

(58) Field of Classification Search
CPC ............. H04N 5/2621; H04N 5/23245; H04N 5/23216; H04N 5/23293; H04N 5/23206
USPC ...................................... 348/222.1
See application file for complete search history.

(56) References Cited

U.S. PATENT DOCUMENTS

| 8,615,111 B2 | 12/2013 | Garten |
| 2005/0129324 A1 | 6/2005 | Lemke |
| 2006/0045372 A1 | 3/2006 | Wang et al. |
| 2008/0307307 A1* | 12/2008 | Ciudad .................. G06T 13/80 715/719 |
| 2009/0110239 A1 | 4/2009 | Chen et al. |

(Continued)

FOREIGN PATENT DOCUMENTS

| CN | 105320428 A | 2/2016 |
| EP | 2056256 A2 | 5/2009 |

(Continued)

OTHER PUBLICATIONS

Sufyan, et al., "Removal of Unwanted Object in a Video by using Video Inpainting Technique : A Review", International Journal of Advance Research in Computer Science and Management Studies, vol. 2, Issue 3, Mar. 2014, pp. 351-356.

(Continued)

*Primary Examiner* — Yogesh K Aggarwal
(74) *Attorney, Agent, or Firm* — Chip Law Group

(57) ABSTRACT

An image-capture device and method are disclosed. The image-capture device renders an application interface comprising a first preview of a scene to be captured by the image-capture device that comprises at least a first object. The image-capture device detects an undesired object in the first preview of the scene based on a selection of the first object. The detected undesired object is removed from the first preview of the scene. The image-capture device fills a portion of the first preview of the scene that corresponds to the removed undesired object in the first preview of the scene with at least one of a background region or a foreground region. The image-capture device generates a second preview of the scene based on the remove and the fill. The image-capture device further captures and generates an image of the scene based on the generated second preview.

24 Claims, 12 Drawing Sheets

(56) References Cited

U.S. PATENT DOCUMENTS

| | | | |
|---|---|---|---|
| 2011/0078801 A1* | 3/2011 | Bae .................. | G06F 17/30056 |
| | | | 726/29 |
| 2014/0063197 A1* | 3/2014 | Yamamoto ............. | G08G 1/166 |
| | | | 348/46 |
| 2014/0184858 A1 | 7/2014 | Yu et al. | |
| 2014/0321771 A1 | 10/2014 | Reinisch et al. | |
| 2015/0015678 A1* | 1/2015 | Kato ....................... | G06T 5/005 |
| | | | 348/50 |
| 2015/0022698 A1* | 1/2015 | Na ..................... | H04N 5/23222 |
| | | | 348/241 |
| 2016/0035074 A1 | 2/2016 | Jeong et al. | |
| 2016/0198097 A1 | 7/2016 | Yewdall et al. | |
| 2018/0027305 A1* | 1/2018 | Bagheri ............ | H04N 21/8126 |

FOREIGN PATENT DOCUMENTS

| | | |
|---|---|---|
| EP | 2980758 A2 | 2/2016 |
| JP | 2009-134719 A | 6/2009 |
| KR | 10-2014-0088752 A | 7/2014 |
| KR | 10-2015-0009184 A | 1/2015 |
| TW | 1241127 B | 10/2005 |
| WO | 2016/017987 A1 | 2/2016 |

OTHER PUBLICATIONS

Extended European Search Report of EP Patent Application No. 18194085.9, dated Jan. 8, 2019, 09 pages.

* cited by examiner

DYNAMIC GENERATION OF IMAGE OF A SCENE BASED ON REMOVAL OF UNDESIRED OBJECT PRESENT IN THE SCENE

CROSS-REFERENCE TO RELATED APPLICATIONS/INCORPORATION BY REFERENCE

None.

FIELD

Various embodiments of the disclosure relate to image capture and image processing technologies. More specifically, various embodiments of the disclosure relate to an image-capture device for dynamic generation of an image of a scene based on removal of undesired object present in the scene.

BACKGROUND

With the advent of digital cameras and smart electronic devices, such as smartphones with integrated camera, the popularity of photography has tremendously increased. It has become possible for users to capture desired image using these devices irrespective of time-of-day or location. During the capture of an image or a video, a user may want to focus on objects that are of interest in a scene rather than other unwanted objects that may also be present in the scene. At present, the digital cameras or the smartphones captures all objects of a scene that are within the camera view angle. In such cases, the user may try to capture the scene from different view angles to capture the objects that are of interest for a desired image. Alternatively, the user may remove the unwanted objects by post-processing, such as image editing, of the photographed image. However, re-photographing may be burdensome, and it may also increase a likelihood of photographing the objects that are of interest in an undesired condition due to a change in conditions of the surrounding environment. Further, the removal of the unwanted objects from the photographed image may be tiresome and leave image artifacts in the processed image. For example, removed portions that corresponds to the unwanted objects in the captured scene may not be accurately restored.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image-capture device and method for dynamic generation of an image of a scene based on removal of undesired object present in the scene is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
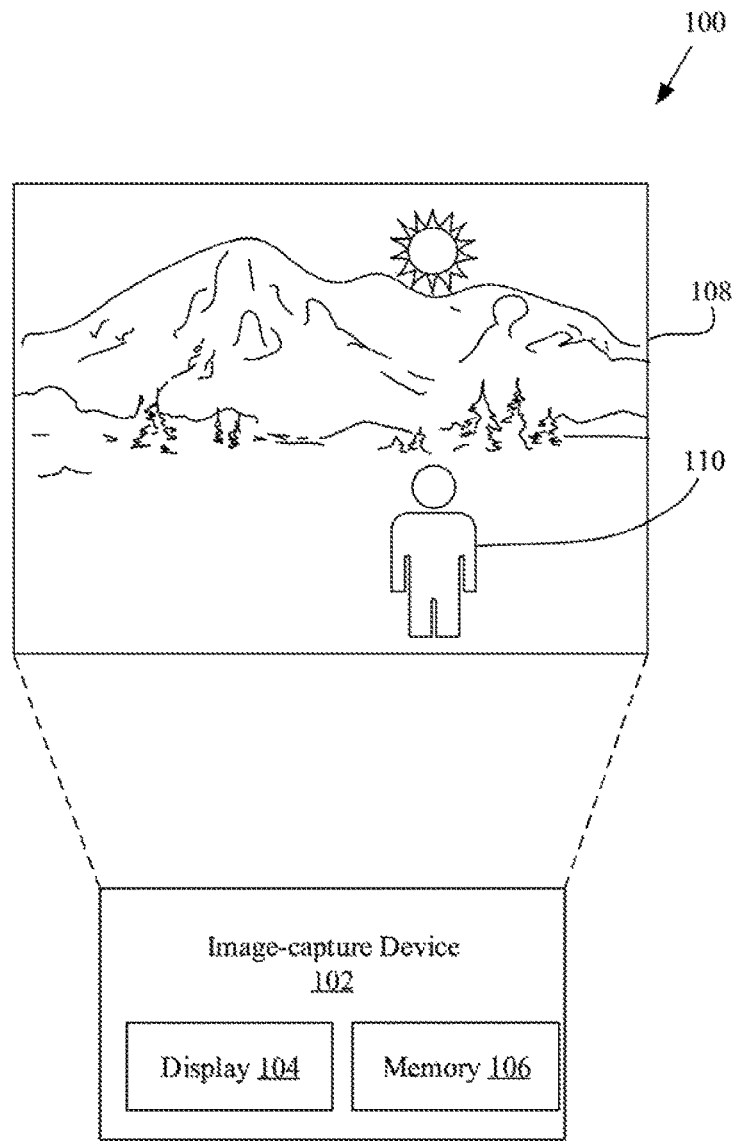
FIG. 1 is a block diagram that illustrates an exemplary environment for dynamic generation of an image of a scene based on removal of an undesired object present in the scene, in accordance with an embodiment of the disclosure.

Various implementations may be found in an image-capture device and method for dynamic generation of an image of a scene based on removal of an undesired object present in the scene. Exemplary aspects of the disclosure may comprise a method for dynamic generation of an image of a scene based on removal of an undesired object in the scene by a selective capture of the scene. The method may be implemented in an image-capture device that may include at least circuitry, a memory, and a display. The display may be configured to render an application interface comprising a first preview of a scene to be captured by the image-capture device. The first preview of the scene may comprise at least a first object. The circuitry may be configured to detect an undesired object in the preview of the scene based on a selection of the at least first object in the preview of the scene. The circuitry may be further configured to remove the detected undesired object from the first preview of the scene. The circuitry may be further configured to fill a portion of the first preview of the scene that corresponds to the removed undesired object in the first preview of the scene. The portion may be filled with at least one of a background region or a foreground region. The circuitry may be further configured to generate a second preview of the scene based on the removal of the detected undesired object and the filling of the portion with either the background region or the foreground region. The circuitry may be further configured to generate an image of the scene based on the generated second preview.

In accordance with an embodiment, the selection of the first object may be based on a touch-based input. In some embodiments, the selection of the first object may be further based on at least one of a voice-based input or a text-based input. The circuitry may be further configured to compute co-ordinates of a boundary of the detected undesired object. The co-ordinates of the boundary of the detected undesired object may be computed based on a position, a size, or a shape of the detected undesired object. The circuitry may be further configured to remove the detected undesired object from the first preview of the scene based on the computed coordinates of the boundary of the detected undesired object.

In accordance with an embodiment, the circuitry may be further configured to generate the background region based on at least one reference image of a library of reference images stored in a memory of the image-capture device or accessed from a cloud server. Further, at least one reference image may be selected by a search in the library of reference images based on one of the position, the size, or the coordinates of the boundary of the detected undesired object. The circuitry may be further configured to generate the background region based on pixels within proximity of the portion that corresponds to the removed undesired object. The circuitry may be further configured to generate the background region based on at least one previously captured image. In accordance with an embodiment, the circuitry may be further configured to replace the portion with the foreground region based on a selection of a second object from the library of reference images stored in the memory or the cloud sever.

In accordance with an embodiment, based on a presence of at least three objects in the first preview of the scene to be captured by the image-capture device, the circuitry may be further configured to reduce a distance between two objects of the at least three objects in the first preview of the scene. The distance between the two objects may be reduced after the removal of the detected undesired object from the at least three objects in the first preview of the scene. The circuitry may be further configured to reduce the distance between the two objects in the first preview of the scene based on a user input to reduce the distance. The distance between the two objects in the first preview of the scene may be further reduced based on at least an object-wise optical zoom-in of the at least two objects.

In accordance with an embodiment, the circuitry may be further configured to determine different layers in the first preview of the scene based on at least depth information of the different layers. The circuitry may be further configured to remove at least one layer from the different layers based on a selection of the at least one layer.

FIG. 1 is a block diagram that illustrates an exemplary environment for dynamic generation of an image of a scene based on removal of an undesired object present in the scene, in accordance with an embodiment of the disclosure. With reference to FIG. 1, there is shown an exemplary environment 100. The exemplary environment 100 may include an image-capture device 102. The image-capture device 102 may include a display 104 and a memory 106, as shown. With reference to FIG. 1, there is further shown a scene 108 to be captured by the image-capture device 102. The scene 108 may further comprise at least a first object 110. The image-capture device 102 may be held by a user 112.

The image-capture device 102 may comprise suitable logic, circuitry, interfaces, and/or code that may be configured to capture an image (or a video) of the scene 108 based on removal of an undesired object, such as the first object 110, present in the scene 108 during the capture of the image (or the video). The image-capture device 102 may detect the undesired object in a first preview of the scene 108 based on a selection of the first object 110. The image-capture device 102 may fill a portion of the first preview of the scene 108 that corresponds to the removed undesired object with at least one of a background region or a foreground region. Based on the removal of the undesired object and the fill, a second preview of the scene 108 may be generated by the image-capture device 102. The image-capture device 102 may further generate an image of the scene 108 based on the second preview of the scene 108. A composition of the second preview of the scene 108 may be different from the first preview of the scene 108. Examples of the image-capture device 102 may include, but are not limited to, a digital camera, a digital camcorder, a bridge camera, a camera phone, such as a smartphone, a compact camera, a closed-circuit television (CCTV) camera, a dashboard camera, a laptop computer, a tablet, or a smart appliance with an integrated camera.

The display 104 may comprise suitable logic, circuitry, interfaces, and/or code that may be configured to render an application interface comprising the first preview of the scene 108 to be captured by the image-capture device 102. A user, such as the user 112, may launch a viewfinder application stored in the memory 106 and point the image-capture device 102 towards the scene 108 to be captured. The first preview of the scene 108 may be visible on the application interface, such as a camera viewfinder interface. In some embodiments, the display 104 may be integrated to the image-capture device 102. In some embodiments, the display 104 may be communicatively coupled with the image-capture device 102, via a communication channel (not shown). In such cases, the display 104 may be associated with an external device, such as an endoscopic device, a personal computer, a laptop computer, a computer workstation, a mainframe computer, a handheld computer, a personal digital assistant, a smartphone, a smart appliance, a video player, or a television.

The memory 106 may comprise suitable logic, circuitry, interfaces, and/or code that may be configured to temporarily store the scene 108 to be captured by the image-capture device 102. For example, the memory 106 may temporarily store the scene 108 in an image buffer within the memory 106 for processing. The memory 106 may be further configured to store a library of reference images. The memory 106 may be further configured to store a set of instructions executable by the image-capture device 102 to generate the image of the scene 108 based on the removal of the undesired object from the scene 108. The memory 106 may be further configured to store operating systems and associated applications of the image-capture device 102. Examples of implementation of the memory 106 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), Read Only Memory (ROM), Hard Disk Drive (HDD), a Secure Digital (SD) card, flash drive, cache memory, and/or other non-volatile memory.

The scene 108 may correspond to a field-of-view of an area that comprises at least one object, for example, the first object 110. The first object 110 may correspond to a living entity (e.g., a human being, an animal, or a plant) or a non-living entity (e.g., a vehicle, a house, a sculpture, or a rock). The first object 110 may further correspond to a water body, a celestial body, a terrestrial body, or a combination thereof. The scene 108 may correspond to the field-of-view of the area that is visible through the image-capture device 102 from a particular position and orientation in space. The scene 108 may also correspond to the field-of-view of the area that is visible through the image-capture device 102 associated with same or different positions with fixed or different orientations, for example, in panoramic photography.

In operation, the user 112 may launch the camera viewfinder application (e.g. an image-capturing application) provided in the image-capture device 102, and may point the image-capture device 102 towards the scene 108. The user 112 may select an object selection mode (such as desired or an undesired object selection mode) in the camera viewfinder application. The display 104 of the image-capture device 102 may be configured to render an application interface in the desired/undesired object selection mode. The application interface (e.g., a graphical user interface (GUI) of the camera viewfinder application) may comprise a first preview of the scene 108. The first preview of the scene 108 may refer to a live preview of the scene 108 as visualized through the image-capture device 102. The first preview of the scene 108 may be temporally stored as image buffer in the memory 106

In some embodiments, the first preview of the scene 108 may comprise a plurality of objects and a background. Some objects of the plurality of objects may be desired objects, whereas other objects may be undesired objects. The desired objects may be those objects that a user, such as the user 112, wants to be included in an image to be captured by the image-capture device 102. The undesired objects may be those objects that the user wants to exclude in an image to be captured by the image-capture device 102. For example, in reference to FIG. 1, the first preview of the scene 108 may comprise the first object 110. The user 112 may want to capture a sunset view that may be the background of the scene 108 without the first user 110. Based on the render of the first preview of the scene 108 on the display 104, the image-capture device 102 may allow the user 112 of the image-capture device 102 to select an undesired object from the first preview of the scene 108. The user of the image-capture device 102 may provide a first user input to select the first object 110 in the first preview of the scene 108 as the undesired object. The first user input may correspond to at least one of a touch-based input, a voice-based input, or a text-based input. Based on the selection of the first object 110, the image-capture device 102 may detect the undesired object in the first preview of the scene 108. For example, the first object 110 in the first preview of the scene 108 may be detected as the undesired object based on the selection of the first object 110 by the user 112. The detection of the undesired object in the first preview of the scene 108 has been described in detail, for example, in FIG. 3A to 3G.

The image-capture device 102 may be configured to remove the detected undesired object (e.g., the first object 110) from the first preview of the scene 108. In a process to remove the detected undesired object (e.g., the first object 110), the image-capture device 102 may be configured to compute coordinates of a boundary of the detected undesired object. The coordinates of the boundary of the detected undesired object (e.g., the first object 110) may be computed based on a position, a size, or a shape of the detected undesired object in the first preview of the scene 108. Based on the computed coordinates of the boundary of the detected undesired object, the image-capture device 102 may remove the detected undesired object from the first preview of the scene 108. The removal of the detected undesired object has been described in detail, for example, in FIG. 3A to 3G.

The image-capture device 102 may be configured to fill a portion of the first preview of the scene 108 with at least one of a background region or a foreground region. The portion of the first preview of the scene 108 may correspond to the removed undesired object (e.g., the first object 110) in the first preview of the scene 108. Prior to the fill of the portion, the at least one of the background region or the foreground region may be determined by the image-capture device 102. In some embodiments, the image-capture device 102 may be configured to generate the background region based on at least one reference image of the library of reference images. The library of the reference images may be stored in the memory 106 of the image-capture device 102 or accessed from a cloud server (not shown). Further, the reference image (i.e. the at least one reference image) may be selected by a search in the library of the reference images. The search may be executed based on the position, the size, or the coordinates of the boundary of the detected undesired object. In some embodiments, the image-capture device 102 may be configured to generate the background region based on pixel values of pixels within proximity of the portion that corresponds to the removed undesired object. The pixels within proximity of the portion may correspond to the pixels that are within proximity of the computed coordinates of the boundary of detected undesired object. In some embodiments, the image-capture device 102 may be configured to generate the background region based on at least one of previously captured images. In some embodiments, the image-capture device 102 may be configured to replace the portion with the foreground region based on a selection of a second object from the library of reference images. For example, the image-capture device 102 may search the second object in the library of reference images based on an input provided by the user 112. The fill of the portion of the first preview of the scene 108 has been described in detail, for example, in FIG. 3A to 3G.

The image-capture device 102 may be configured to generate a second preview of the scene 108 based on the removal of the detected undesired object and the fill operation. The second preview of the scene 108 does not include the first object 110 that had been removed. Based on the generated second preview of the scene 108, the image-capture device 102 may be configured to generate the image of the scene 108 as desired by the user 112.

In certain scenarios, three or more objects may be present in a scene, such as the scene 108, which is to be captured by the image-capture device 102. For example, an undesired object may be present in between two desired objects as viewed in the first preview of the scene 108. The undesired object may be selected via the application interface and removed in a similar process, as described above. After the removal of the undesired object located between the two desired objects in the first preview of the scene 108, the user 112 may provide an input to change the position of the two desired objects. For example, the user 112 may select the two desired objects by placing two fingers on the two desired objects and dragging them closer to each other in the first preview. The image-capture device 102 may be configured to reduce a distance between two desired objects in the first preview of the scene 108 based on the received user input.

In some embodiments, the image-capture device 102 may be configured to reduce the distance between the two desired objects in the first preview of the scene 108 based on a distance value. For example, the user 112 may provide the distance value (e.g. through the text-based input) by which the distance between the two desired objects may be reduced by the image-capture device 102. In some embodiments, the image-capture device 102 may be further configured to reduce the distance between the two desired objects based on at least an object-wise optical zoom-in of the at least two desired objects. The reduction of the distance between the two objects in the first preview of the scene 108 has been described in detail, for example, in FIG. 3A and FIG. 3G.

The image-capture device 102 may be configured to determine different layers in the first preview of the scene 108. The different layers in the first preview of the scene 108 may be determined based on at least depth information of the different layers. The image-capture device 102 may be further configured to remove at least one layer from the different layers based on a selection of the at least one layer. For example, the user 112 may provide an input to select the at least one layer from the different layers.

Figure 2:
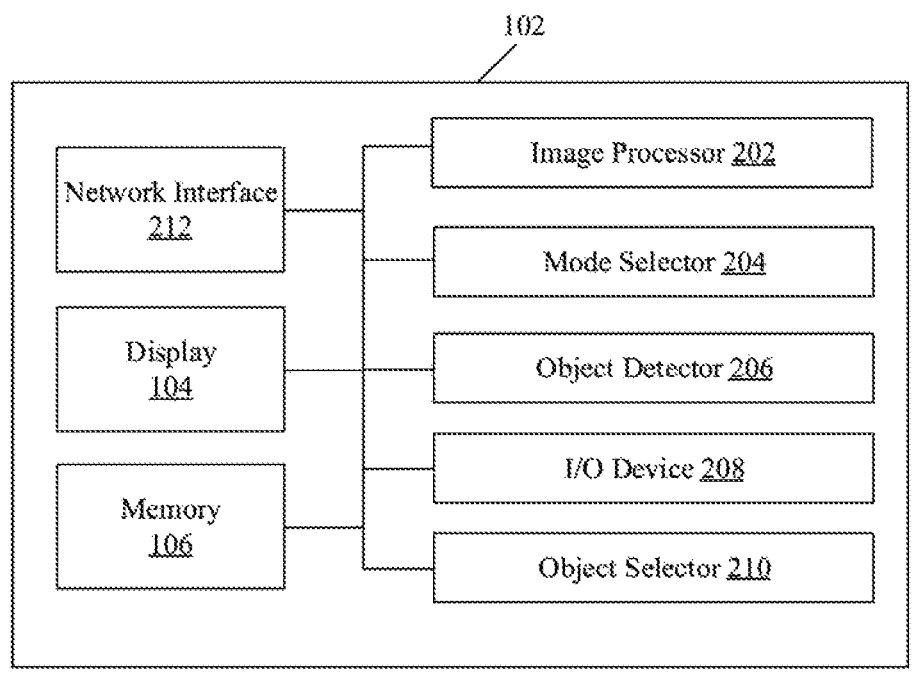
FIG. 2 is a block diagram that illustrates an exemplary image-capture device, in accordance with an embodiment of the disclosure.

FIG. 2 is a block diagram that illustrates an exemplary image-capture device, in accordance with an embodiment of the disclosure. FIG. 2 is described in conjunction with elements from FIG. 1. With reference to FIG. 2, there is shown a block diagram of an exemplary image-capture device, such as the image-capture device 102. The image-capture device 102 may include circuitry, such as an image processor 202, a mode selector 204, an object detector 206, an input/output (I/O) device 208, and an object selector 210. The I/O device 208 may comprise the display 104 (FIG. 1). The image-capture device 102 may further include a network interface 212. With reference to FIG. 2, there is further shown the memory 106 of FIG. 1.

In accordance with an embodiment, the image processor 202 may be communicatively coupled to the display 104, the memory 106, the mode selector 204, the object detector 206, the I/O device 208, the object selector 210, and the network interface 212. The network interface 212 may be configured to facilitate communication with external computing devices or servers (not shown), via a communication channel (not shown), under the control of the image processor 202.

The image processor 202 may comprise suitable logic, circuitry, interfaces, and/or code that may be configured to execute a set of instructions stored in the memory 106. The image processor 202 may be configured to generate one or more previews of the scene 108 to be captured by the image-capture device 102. The image processor 202 may be configured to remove an undesired object that is detected in a first preview of the scene 108 based on a selective capture of the scene 108. The image processor 202 may be implemented based on a number of processor technologies, which are known in the art. Examples of the image processor 202 may be an X86-based processor, a Reduced Instruction Set Computing (RISC) processor, an Application-Specific Integrated Circuit (ASIC) processor, a Complex Instruction Set Computing (CISC) processor, and/or other processors or control circuits.

The mode selector 204 may comprise suitable logic, circuitry, interfaces, and/or code that may be configured to provide an object selection mode in the image-capture device 102 where the user 112 may select one or more desired objects or undesired objects during the capture of an image or a video. When the user 112 has turned "ON" the object selection mode by use of the application interface during the capture of a scene (e.g., the scene 108), the image-capture device 102 may allow the user 112 to select the one or more desired objects or undesired objects in the generated preview of the scene 108. Based on the one or more desired objects or undesired objects selected by the user 112, the image processor 202 may generate a desired image of the scene 108 based on the selective capture of desired objects and removal of undesired objects. The mode selector 204 may be implemented on an ASIC or field-programmable gate array (FPGA).

The object detector 206 may comprise suitable logic, circuitry, interfaces, and/or code that may be configured to detect one or more objects (e.g., the first object 110) in first preview of the scene 108. The first preview of the scene 108 may refer to a live preview of the scene 108 as visualized through the image-capture device 102. The one or more objects may correspond to at least one of a two-dimensional (2D) object or a three-dimensional (3D) object. The one or more objects may be detected in first preview of the scene 108 when the object selection mode is in "ON" state. The object detector 206 may be further configured to detect boundaries of the one or more objects in the first preview of the scene 108 by use of one or more boundary detection algorithms. Examples of the boundary detection algorithms may include, but are not limited to human shape-based object boundary detection, pre-specified shape-based or template based object boundary detection, Canny edge detectors, gradient-based boundary detection, such as by use of Sobel operator, and Prewitt operator. The object detector 206 may be further configured to detect one or more layers in the first preview of the scene 108 based on at least depth information associated with the one or more objects including background. The object detector 206 may be implemented on an ASIC or field-programmable gate array (FPGA).

The I/O device 208 may comprise suitable logic, circuitry, interfaces, and/or code that may be configured to receive the one or more user inputs from and provide one or more corresponding outputs to the user of the image-capture device 102. Examples of the input devices may include, but are not limited to, a camcorder, a touch screen, a joystick, a microphone, a motion sensor, a gaming device, a light sensor, and/or a docking station. Examples of the output devices may include, but are not limited to, the display 104, a projector screen, and/or a speaker.

The object selector 210 may comprise suitable logic, circuitry, interfaces, and/or code that may be configured to select the one or more undesired objects or desired objects based on the one or more user inputs provided by the user 112 through the I/O device 208. The object selector 210 may be further configured to select (or discard) the one or more layers of the scene 108 based on the one or more user inputs. The object selector 210 may be implemented on an ASIC or FPGA. In an implementation, the object selector 210 may be implemented on the same ASIC or FPGA as the object detector 206.

The network interface 212 may comprise suitable logic, circuitry, interfaces, and/or code that may be configured to communicate with the external computing devices or servers, via a communication channel. The network interface 212 may be implemented by application of known technologies to support wired or wireless communication of the image-capture device 102 with the communication channel. Components of the network interface 212 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the image-capture device 102 may be operated by the user 112 to capture an image of the scene 108 that comprises one or more objects, such as the first object 110. The user 112 may focus the image-capture device 102 on the scene 108 to capture the image of the scene 108. However, during the capture of the scene 108, the user 112 of the image-capture device 102 may not want to capture at least one undesired object from the one or more objects of the scene 108. In other words, the user 112 may prefer a desired image of the scene 108 to be captured by the image-capture device 102 such that the captured image does not include the undesired object. For example, the user 112 may focus on a background (e.g., a sunset along a mountain) of the scene 108 by the image-capture device 102 to capture the scene 108. However, the scene 108 may also comprise the first object 110 (e.g., a human that may block a suitable sunset view in the background of the scene 108) that the user 112 do not want to capture. Therefore, to capture the scene 108 as desired by the user 112, the user may want the image-capture device 102 to operate in the object selection mode. The user 112 may select the object selection mode of the image-capture device 102 from the application interface rendered on the display 104. The mode selector 204 may be configured to turn "ON" or activate the object selection mode prior to the capture of the scene 108. The user 112 may change the state of the mode selector 204 to the "ON" state or activate the object selection mode based on at least one of a touch-based input, a voice-based input, or a text-based input by the user 112.

Based on the "ON" state by the mode selector 204, the image processor 202 may be configured to generate a first preview of the scene 108 to be captured by the image-capture device 102. The first preview of the scene 108 may comprise the one or more objects, for example, the first object 110 and the background. The display 104 may be configured to render the application interface comprising the first preview of the scene 108 that comprises the first object 110 and the background. The object detector 206 may be configured to detect the first object 110 in the first preview of the scene 108. The object detector 206 may further highlight the one or more objects, for example, the first object 110 in the first preview of the scene 108.

The image processor 202 may be configured to allow the user 112 of the image-capture device 102 to select desired or undesired objects in the first preview of the scene 108 rendered on the display 104. For example, based on the rendered first preview of the scene 108 that comprises the first object 110, the image processor 202 may be configured to receive the first user input to select the first object 110 as one of the desired object or the undesired object. In some embodiments, the first user input may correspond to a voice-based input. For example, the user 112 may speak at least an attribute of the first object 110 to select the first object 110 as one of the desired object or the undesired object. The attribute of the first object 110 may correspond to at least one of a name, a gender, a height, a size, a position, a shape, or a color of the first object 110. For example, the voice-based input may correspond to "select the boy as the undesired object." In such a scenario, the boy (e.g., the first object 110) in the first preview of the scene 108 may be selected as the undesired object by the object selector 210. In some embodiments, the first user input may also correspond to at least one of a text-based input or a touch-based input to select the desired object or the undesired object from the one or more objects in the first preview of the scene 108. In the text-based input, the user 112 may utilize the I/O device 208 (e.g., a virtual keyboard on the display 104) to input the attribute of the first object 110. In the touch-based input, the user 112 may touch the first object 110 on the display 104 to select the first object 110 as one of the desired object or the undesired object. In some embodiments, the touch-based input may be associated with one or more defined touch patterns to select the desired object or the undesired object. For example, based on a double touch on the first object 110 in the first preview of the scene 108 rendered on the display 104, the object selector 210 may select the first object 110 as the undesired object. Similarly, based on a single touch on the first object 110 in the first preview of the scene 108 rendered on the display 104, the object selector 210 may select the first object 110 as the desired object. Therefore, based on the first user input by the user of image-capture device 102, the object selector 210 may select the first object 110 as one of the desired object or the undesired object. However, in a scenario where no user input is received by the object selector 210 in a defined time period after the render of the first preview of the scene 108 on the display 104, the first object 110 may be selected as the desired object. Thereafter, based on the selection by the object selector 210, the object detector 206 may detect the selected object as one of the desired object or the undesired object. In this case, the first object 110 in the first preview of the scene 108 may be selected as the undesired object and the background as desired.

The image processor 202 may be configured to compute coordinates of a boundary of the detected undesired object. The coordinates of the boundary of the detected undesired object may be computed based on a position, a size, or a shape of the detected undesired object in the first preview of the scene 108. The image processor 202 may execute a process based on a boundary tracing algorithm (e.g., Square Tracing algorithm, Moore-Neighbor Tracing algorithm, or Theo Pavlidis' algorithm) or the boundary detection algorithms to trace and mark the boundary of the detected undesired object. The boundary tracing algorithm may be implemented based on the position, the size, or the shape of the detected undesired object (e.g., the first object 110) in the first preview of the scene 108. Based on the trace of the boundary of the detected undesired object (e.g., the first object 110), the image processor 202 may be configured to compute the coordinates of the boundary of the detected undesired object (e.g., the first object 110). The image processor 202 may be further configured to remove the detected undesired object (e.g., the first object 110) from the first preview of the scene 108 based on the computed coordinates of the boundary of the detected undesired object.

Based on the removed undesired object (e.g., the first object 110) from the first preview of the scene 108, the image processor 202 may be configured to fill (or append) a portion of the first preview of the scene 108 that corresponds to the removed undesired object. The portion of the first preview of the scene 108 may be filled (or replaced) with at least one of a background region or a foreground region. The image processor 202 may determine the at least one of the background region or the foreground region before the fill (or replacement) of the portion of the first preview of the scene 108 that corresponds to the removed undesired object.

In some embodiments, the image processor 202 may be configured to generate the background region based on a library of reference images stored in the memory 106 or in the cloud server. The library of reference images may be a collection of different sets of images of famous places, objects, and user-captured images of different real-world objects captured in different angles or lighting conditions. The image processor 202 may search the library of reference images to determine a presence of at least one reference image that matches (or is similar) with the selected undesired object. A suitable reference image may be determined based on the position, the size, or the coordinates of the boundary of the detected undesired object. If a background or a foreground is available, the reference image background or foreground may be used on the current image, else background is created by predicting and utilization of pixel values from neighboring coordinates.

Based on the determined presence of the suitable reference image in the library of reference images, the image processor 202 may select the reference image from the library of reference images. The image processor 202 may be further configured to generate the background region based on the selected reference image. In some embodiments, the image processor 202 may be configured to generate the background region for objects having missing parts, based on the library of reference images. For example, consider a scenario where there is an overlapped object in the background of the detected undesired object. In such scenario, the image processor 202 may utilize a visible portion of the overlapped object to search for similar objects in the library of reference images. In case of the match between the visible portion of the overlapped object and a relevant object from the library of reference images, the image processor 202 may generate the missing part based on the most closely matching reference image found in the library of reference images. However, when the matching is not found in the library of reference images, the image processor 202 may remove the overlapped object. The match corresponds to a similarity of RGB pixel values, shape, size, and luminance within defined range.

In accordance with an embodiment, in an absence of a suitable reference image in the library of reference images, the image processor 202 may be configured to generate the background region based on at least one of previously captured images. The previously captured images may correspond to images that had been captured in real time or near-real time by the image-capture device 102 before the first preview of the scene 108. The background region may be generated based on the at least one of the previously captured images when the detected undesired object (e.g., the first object 110) is a moving object. However, in case of a still object i.e., the detected undesired object (e.g., the first object 110) is the still object, the image processor 202 may be configured to generate the background region based on pixel values of pixels within proximity of the portion. The pixels within proximity of the portion may correspond to the pixels that are within proximity of the computed coordinates of the boundary of detected undesired object (e.g. pixel values from neighboring coordinates). The pixels in the proximity of the portion may be determined based on a search technique that utilizes spatial correlation among the pixels with an image frame that corresponds to the first preview of the scene 108. In this search technique, an available background area surrounding the removed undesired object is divided into pixel blocks of defined block sizes. Each pixel block of the pixel blocks is compared with a neighboring pixel block. Based on the comparison, the closest neighboring pixel block for each pixel block is determined. Based on the closest neighboring pixel block of each of the pixel blocks, the image processor 202 may generate the background region. The generation of the background region for various cases has been described with illustrative examples, for example, in FIG. 3A to 3G.

In some embodiments, the image processor 202 may be configured to replace the portion with the foreground region. The foreground region may be determined based on a second user input to select a second object, for example a user may choose (or manually select) a desired object, from the library of reference images. The image processor 202 may search the second object from the library of reference images based on the second user input. The second user input may include a preference of the user for the second object. Based on the search of the second object, the image-capture device 102 may replace the portion with the foreground region that correspond to the second object. Such replacement during the capture of the scene 108 may provide a realistic feel to the user 112 even though the second object was actually missing during the capture of the scene 108. In order to execute the replacement, the user 112 may use the I/O device 208 to input the second user input. For example, the user may touch the display 104, for example, a long touch on the display 104 that is greater than a defined time period, such as "2 seconds." In response to the second user input (e.g., the touch input), the image processor 202 may open the library of reference images (e.g., a photo gallery) stored in the memory 106. The user may scroll down the library of reference images to select the second object. Based on the selected second object, the image processor 202 may replace the portion with the selected second object.

After the fill of the portion with the at least one of the background region or the foreground region, the image processor 202 may be configured to execute a filter process to remove artifacts that may have developed during the fill of the portion in the first preview of the scene 108. The filter process may correspond to a low-pass interpolation filter process. A 4-tap linear interpolation filter may be used vertically and horizontally to remove the artifacts.

Based on the remove, fill, and filter processes executed by the image-capture device 102, as described above, the image processor 202 may generate a second preview of the scene 108. The composition of the second preview of the scene 108 is different from the first preview of the scene 108. The display 104 may be further configured to render the second preview of the scene 108 on the application interface. Based on the generated second preview of the scene 108, the image processor 202 may capture and generate the image of the scene 108 with different composition as desired by the user 112 during the capture of the scene 108.

In accordance with an embodiment, the image processor 202 may be configured to reduce a distance between at least two objects in the first preview of the scene 108. For example, consider a scenario where at least three objects are present in the first preview of the scene 108 to be captured by the image-capture device 102. After the removal of the detected undesired object present between the three objects in the first preview of scene 108, the image processor 202 may be configured to reduce the distance between the remaining two objects in the first preview of the scene 108. The distance between the two objects may be reduced based on a third user input provided by the user to reduce the distance. In a similar manner, the image processor 202 may increase the distance between the two objects after the removal of the undesired object from the first preview of the scene 108. In some embodiments, the user 112 may use a touch-based input to drag at least one of the two objects in one or more directions (e.g., horizontally, vertically, or diagonally) so as to reduce or increase the distance between the at least two objects. In some embodiments, the image processor 202 may reduce the distance between the two objects in the first preview of the scene 108 based on at least an object-wise optical zoom-in factor associated with the at least two objects. The reduction of the distance between the two objects has been described in detail, for example, in FIG. 3G.

In accordance with an embodiment, the image processor 202 may be configured to switch position of the two objects in the first preview of the scene 108 after the removal of the undesired object. The user 112 may select from certain points on the in the first preview of the scene 108. Based on the selected points, the two objects of the at least three objects may be switched by the image processor 202 before an actual capture of an image of the scene 108. In some embodiments, the image processor 202 may swap the position of the two objects in the first preview of the scene 108. In some embodiments, the image processor 202 may replace the portion of the first preview of the scene 108 that corresponds to removed undesired object with one of the two objects.

In accordance with an embodiment, the image processor 202 may be configured to determine different layers in the first preview of the scene 108. The different layers in the first preview of the scene 108 may be determined based on at least depth information associated with the objects or background of a scene, such as the scene 108, to be captured. The image processor 202 may be further configured to remove a layer from the different layers based on a user input to remove the layer. In some embodiments, the image processor 202 may be further configured to identify one or more layer objects associated with the different layers. For example, the one or more layer objects may be dynamically identified based on aperture values. For example, a lower aperture value (e.g., 2.8) may focus on a first object. A higher aperture value (e.g., 4.5) may focus on the first object and a second object. A next higher value (e.g., 7.5) may focus on the first object, the second object, and a third object. Using this layering technique, the image processor 202 may dynamically isolate the one or more layer objects that are not required at the time of capture of a scene, and therefore, may retain only the desired objects.

Figure 3A:
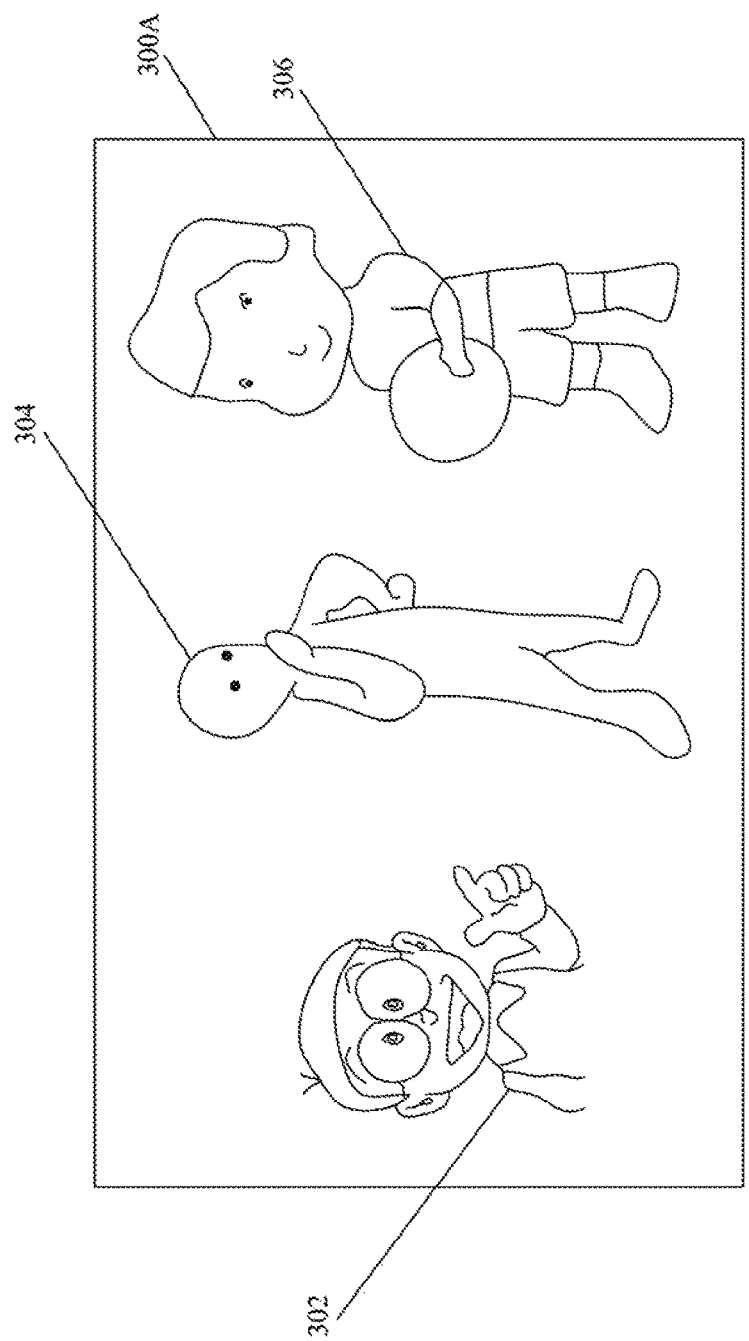
FIG. 3A illustrates a first exemplary scenario for implementation of the disclosed image-capture device and method for dynamic generation of an image of a scene based on removal of an undesired object present between two desired objects in the scene, in accordance with an embodiment of the disclosure.

FIG. 3A illustrates an exemplary scenario for implementation of the disclosed image-capture device and method to dynamically generate an image of a scene by removal of an undesired object between two objects in the scene, in accordance with an embodiment of the disclosure. FIG. 3A is described in conjunction with elements from FIGS. 1 and 2.

With reference to FIG. 3A, there is shown an exemplary scene, such as the scene 300A to be captured by the image-capture device 102 (FIG. 1). The scene 300A comprises three objects 302, 304, and 306. The objects 302 and 306 are present near edges (e.g., a left edge and a right edge) of the scene 300A. The object 304 is present in between the two objects 302 and 306 as viewed through the image-capture device 102.

The user 112 may select the object selection mode of the image-capture device 102 from the application interface rendered on the display 104. The mode selector 204 may be configured to turn "ON" the object selection mode prior to the capture of the scene 108. When the object selection mode is in the "ON" state, the object detector 206 may detect the three objects 302 to 306 in a first preview of the scene 300A to be captured by the image-capture device 102. The display 104 may be configured to render an application interface comprising the first preview of the scene 300A. The user 112 of the image-capture device 102 may provide input, via the I/O device 208, to select the objects 302 to 306 as at least one of a desired object or an undesired object. The input may correspond to one of a touch-based input, a voice-based input, or a text-based input. For example, the user 112 may double tap on the object 304 in the first preview of the scene 300A rendered on the display 104 to select the object 304 as the undesired object. Similarly, the user 112 may single tap on the objects 302 and 306 in the first preview of the scene 300A to select the objects 302 and 306 as desired objects. The image processor 202 may mark the three objects 302 to 306 as the desired objects and the undesired object based on the input by the user 112. Based on the selected undesired object (i.e., the object 304 in this case), the image processor 202 may determine that the undesired object is present between the desired objects (i.e., the objects 302 and 306). The image processor 202 may further determine that the detected undesired object (i.e., the object 304) is overlapped exclusively with a background of the scene 300A and is not at an edge of the scene 300A, as shown. In such a scenario, the image processor 202 may remove the undesired object (i.e., the object 304) from the first preview of the scene 300A. Further, the image processor 202 may fill (or replace) a portion of the first preview of the scene 300A that corresponds to the removed undesired object (i.e., the object 304) with one of a foreground region or a background region based on a preference of the user 112. For example, the image processor 202 may generate the background region based on a reference image selected from the library of reference images stored in the memory 106 or the cloud server. The reference image may be selected from the library of reference images based on a position, a size, or a shape of the detected undesired object (i.e., the object 304). In some embodiments, the image-capture device 102 may be configured to generate the background region to fill the removed portion based on pixel values of pixels within proximity of the removed portion that corresponds to the removed undesired object. The pixels within proximity of the removed portion may correspond to the pixels that are within proximity of the computed coordinates of the boundary of removed undesired object. Based on at least the remove and the fill, as described above, the image processor 202 may capture and generate the image of the scene 300A as desired by the user 112.

Figure 3B:
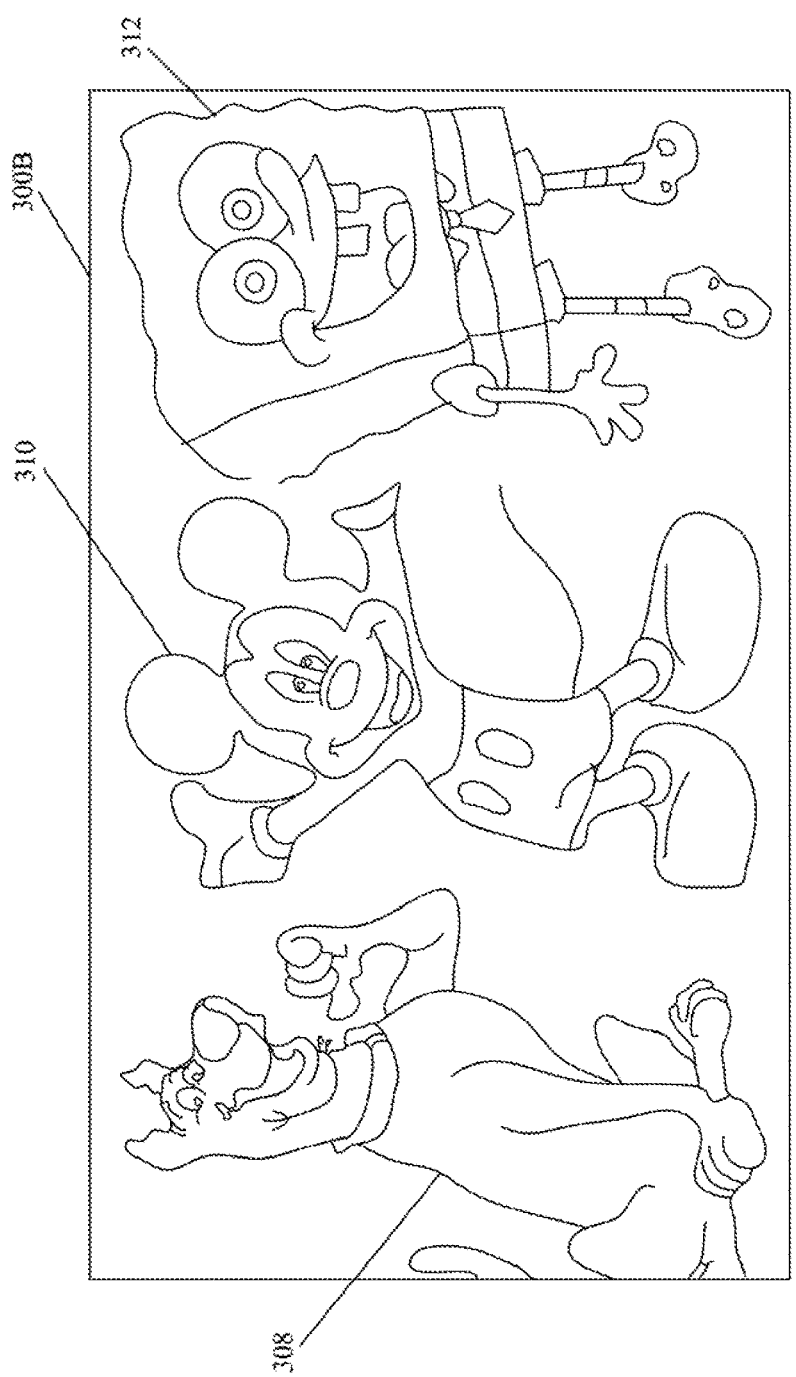
FIG. 3B illustrates a second exemplary scenario for implementation of the disclosed image-capture device and method for dynamic generation of an image of a scene based on removal of an undesired object present at an edge of the scene, in accordance with an embodiment of the disclosure.

FIG. 3B illustrates an exemplary scenario for implementation of the disclosed image-capture device and method to dynamically generate an image of a scene by removal of an undesired object at an edge of the scene, in accordance with an embodiment of the disclosure. FIG. 3B is described in conjunction with elements from FIGS. 1 and 2.

With reference to FIG. 3B, there is shown an exemplary scene, such as the scene 300B to be captured by the image-capture device 102 (FIG. 1). The scene 300B comprises three objects 308, 310, and 312. The objects 308 and 312 may lie near the edges (e.g., a left edge and a right edge) of the scene 300B, as shown. The object 310 may be present in between the two objects 308 and 312.

The device 102 may receive a selection, which is made by user 112 through the application interface rendered on the display 104, and the received selection may select the object selection mode of the image-capture device 102. The object detector 206 may detect the three objects 308 to 312 in the scene 300B, and highlight the detected three objects 308 to 312 for selection as desired or undesired objects. For example, the user 112 may select the object 312 in the first preview of the scene 300B on the display 104 to select the object 312 as the undesired object and the objects 308 and 310 as desired objects. The image processor 202 may be configured to determine that the selected undesired object (e.g. the object 312 in this case) is present at the edge of the scene 300B, as shown. The image processor 202 may further determine that the detected undesired object (i.e., the object 312) is overlapped exclusively with a background of the scene 300B, as shown. In certain scenarios, if the object 312 is a small object (e.g. size of the object 312 may be less than a specified threshold size), then the background creation may be executed similar as the process as described in FIG. 3A, else if object 312 is bigger (size of the object 312 may be greater than a specified threshold size) or close to the scene height (as shown in the scene 300B), then in such scenario, the image processor 202 may reduce the field-of-view to be captured in the first preview of the scene 300B. A second preview of the scene 300B may be generated that excludes an edge portion that includes the detected undesired object (i.e., the object 312). The remaining portion of the scene 300B that includes the desired objects (e.g. the objects 308 and 310) may be captured to generate an image based on the generated second preview, such as a different composition of the scene 330B that the first preview.

Figure 3C:
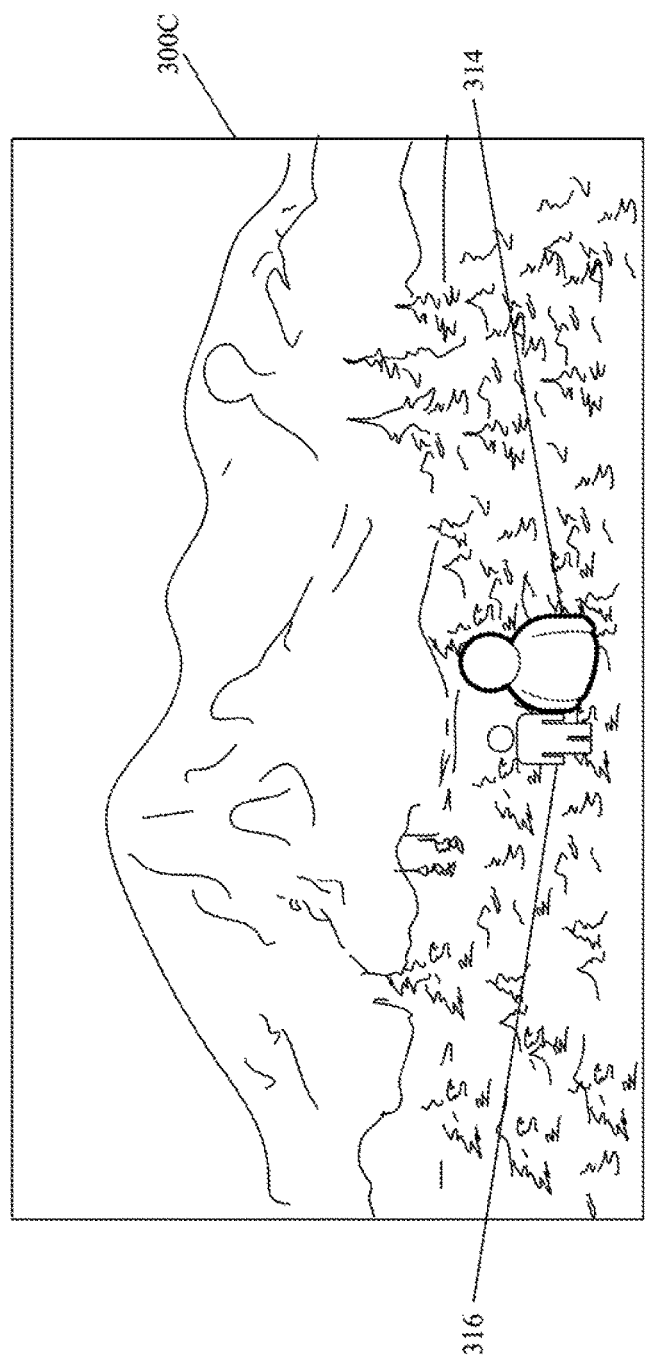
FIG. 3C and FIG. 3D, collectively, illustrates a third exemplary scenario for implementation of the disclosed image-capture device and method for dynamic generation of an image of a scene based on removal of an undesired object present in the scene without an overlap with a background object in the scene, in accordance with an embodiment of the disclosure.
Figure 3D:
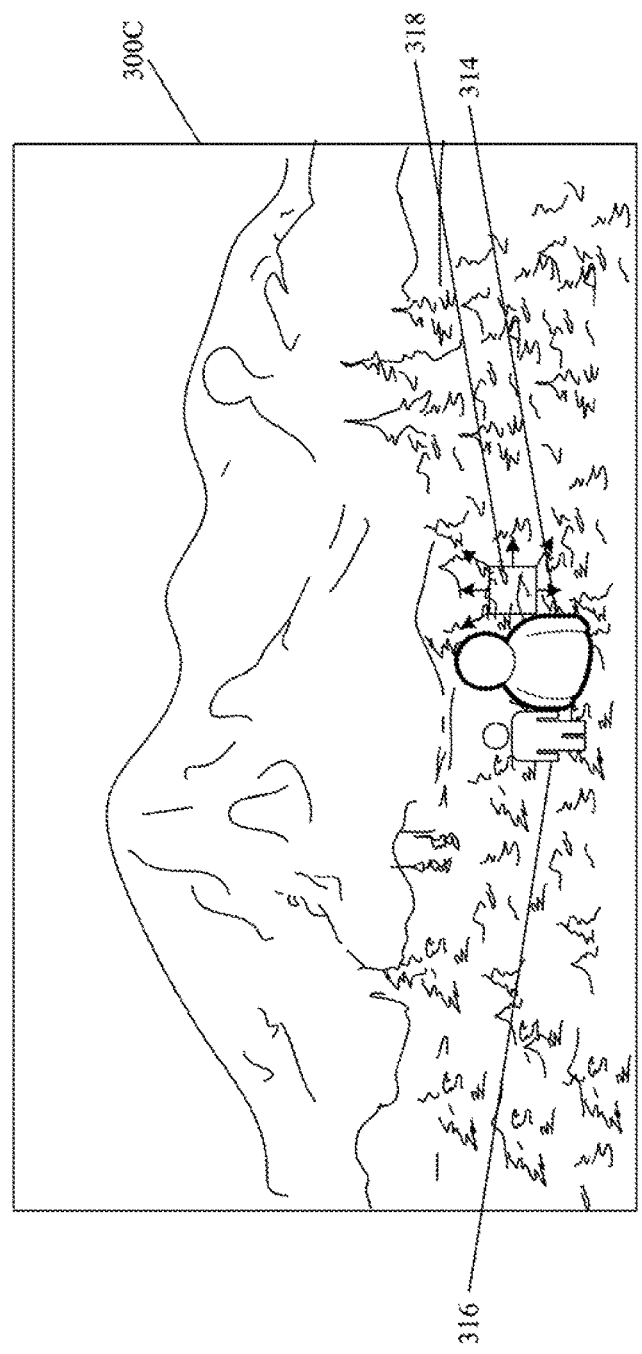

FIGS. 3C and 3D, collectively, illustrates an exemplary scenario for implementation of the disclosed image-capture device and method to dynamically generate an image of a scene by removal of an undesired object that is without an overlap with a background object in the scene, in accordance with an embodiment of the disclosure. FIGS. 3C and 3D are described in conjunction with elements from FIGS. 1 and 2.

With reference to FIGS. 3C and 3D, there is shown an exemplary scene, such as the scene 300C, to be captured by the image-capture device 102 (FIG. 1). The scene 300C comprises two objects 314 and 316. The object 314 may be selected as an undesired object and the object 316 may be selected as a desired object based on user input. With reference to FIGS. 3C and 3D, there is further shown that the undesired object (i.e., the object 314) does not overlap with another any background object (i.e. another object that may be present behind the object 314 in the field-of-view of the image-capture device 102). In such a scenario, after removal of the undesired object (i.e., the object 314) from a first preview of the scene 300C, the image processor 202 may fill a portion of the first preview of the scene 300C that corresponds to removed undesired object with a background region. The background region for the portion may be generated based on pixel values of pixels within proximity of the portion that corresponds to the removed undesired object (i.e., the object 314). For example, the adjoining region of the background region may be generated based on pixels blocks (for example, the pixel blocks with size "4×4 pixel" block) from surrounding left, right, bottom, top, or diagonally available pixel blocks. The adjoining region of the background region may be generated based on the closest match neighboring pixel blocks. The image processor 202 may be configured to partition an adjacent background of the detected undesired object (i.e., the object 314) into one or more blocks of a predefined size, for example "4×4 pixel" block.

With reference to FIG. 3D, there is shown an exemplary block, such as a pixel block 318. Based on the left, right, bottom, top, or diagonally located pixel blocks in the surrounding area of the pixel block 318, the image processor 202 may determine a matching pattern of pixel values within proximity of the pixel block 318. The image processor 202 may generate the background region to fill the portion that corresponds to the removed undesired object (i.e., the object 314) based on the determined matching pattern. For example, the background region may be generated based on correlation of neighboring pixel blocks within a same frame that corresponds to the frame of image that is to be captured. The image processor 202 may minimize an error, if any, due to the generation of the background region by using a linear model prediction method based on following equation (1):

$$pred(i,j)=\alpha*Ref(i',j')+\beta \qquad (1)$$

Where, pred(i,j) represents a prediction pixel block, and Ref(i',j') represents down-sampled reconstructed sample of the neighboring left, right, bottom, top, or diagonally pixel blocks. The parameters α and β may be derived by minimizing regression error between the neighboring reconstructed pixel block samples around the current block. Based on the parameters computed for an adjacent pixel block of a missing part of the background, the image processor 202 may generate the background portion of the current pixel block, such as a current block under processing in the portion that corresponds to the removed undesired object (i.e., the object 314).

Figure 3E:
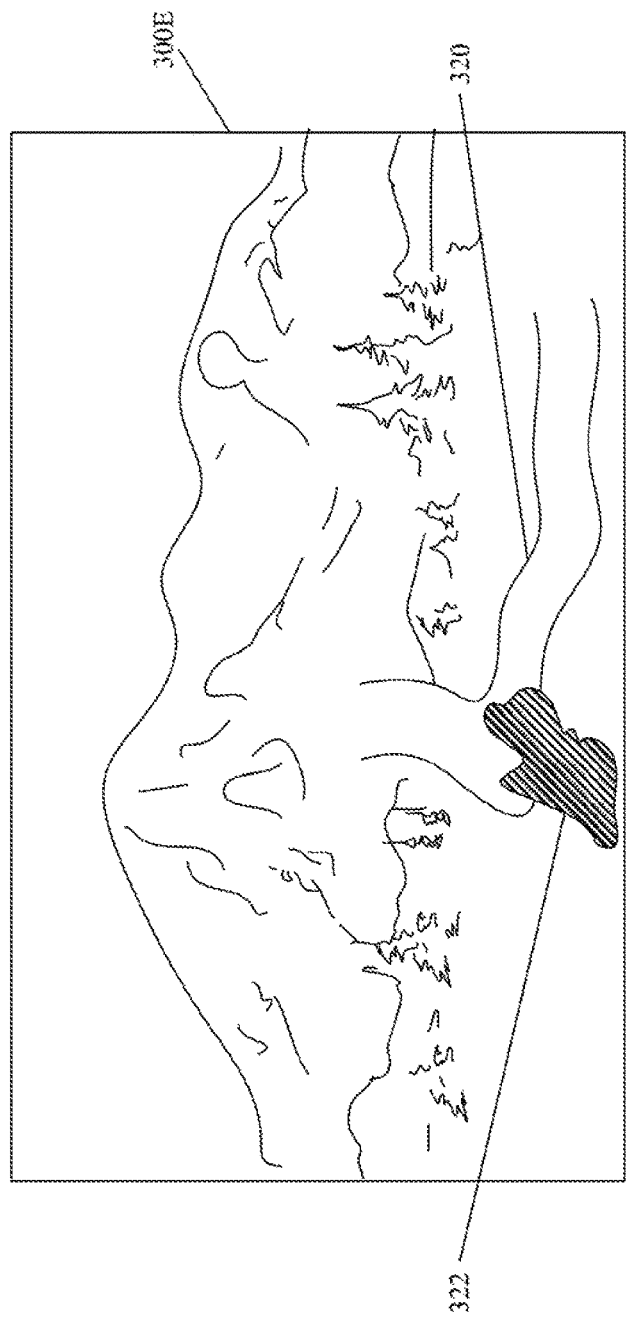
FIG. 3E illustrates a fourth exemplary scenario for implementation of the disclosed image-capture device and method for dynamic generation of an image of a scene based on removal of an undesired object that overlaps with a desired object in the scene, in accordance with an embodiment of the disclosure.

FIG. 3E illustrates an exemplary scenario for implementation of the disclosed image-capture device and method to dynamically generate an image of a scene by removal of an undesired object that overlaps with a desired object in the scene, in accordance with an embodiment of the disclosure. FIG. 3E is described in conjunction with elements from FIGS. 1 and 2.

With reference to FIG. 3E, there is shown an exemplary scene, such as the scene 300E to be captured by the image-capture device 102 (FIG. 1). There is shown at least two objects 320 and 322 in the scene 300E. The object 320 (e.g., a river) has been detected as a desired object and the object 322 (e.g., a rock) has been detected as an undesired object based on input by the user 112 of the image-capture device 102. With reference to FIG. 3E, there is further shown that the undesired object (i.e., the object 322) partially overlaps with another object, such as the desired object (i.e., the object 320) in the scene 300E. In such a scenario, after removal of the undesired object (i.e., the object 322) from a first preview of the scene 300E, the image processor 202 may fill a portion of the first preview of the scene 300E that corresponds to removed undesired object with a background region. In some embodiments, the background region for the portion may be generated based on pixel values of pixels within proximity of the portion that corresponds to the removed undesired object (i.e., the object 322). In some embodiment, the background region for the portion may be generated based on at least one reference image selected from a library of reference images stored in the memory 106 or the cloud server. The. The image processor 202 may determine, based on a size of the desired background object (i.e., the object 320), whether the background region for the portion should be generated based on either the pixels within proximity of the portion or the reference image selected from the library of reference images. For example, if the size of remaining portion of the desired background object (i.e., the object 320) that is overlapped with the undesired object (i.e., the object 322) is greater than a defined value (e.g., 40 percent) of its size, then the image processor 202 may generate the background region based on at least one reference image selected from the library of reference images. However, if the size of the remaining portion of the desired background object (i.e., the object 320) that is overlapped with the undesired object (i.e., the object 322) is less than the defined value (e.g., 40 percent) of its size, then the image processor 202 may discard the desired background object from the first preview of the scene 300E. In such a case, the background region may be generated based on the pixel values of pixels within proximity of the portion that corresponds to the removed undesired object (i.e., the objects 320 and 322).

In accordance with an embodiment, a visible region of the overlapped object (such as the object 320) may be utilized to search for a similar object in the library of reference images. The image processor 202 may be configured to ascertain whether a matching object is found in the library of reference images. In cases where the matching object is found, the image processor 202 may be configured to create the missing region of the overlapped object from the most closely matching image reference. An image filter may be applied on the overlapped object (a partial area in the whole image) for smooth blend of the missing region with the overlapped object smooth such that the entire overlapped object after creation appears contiguous and real with respect to parameters, such as luminance, chrominance, and overall texture. In cases where the matching object is not found, the image processor 202 may be configured to remove the overlapped object (such as the object 320) from the background of the first preview of the scene 300E.

Figure 3F:
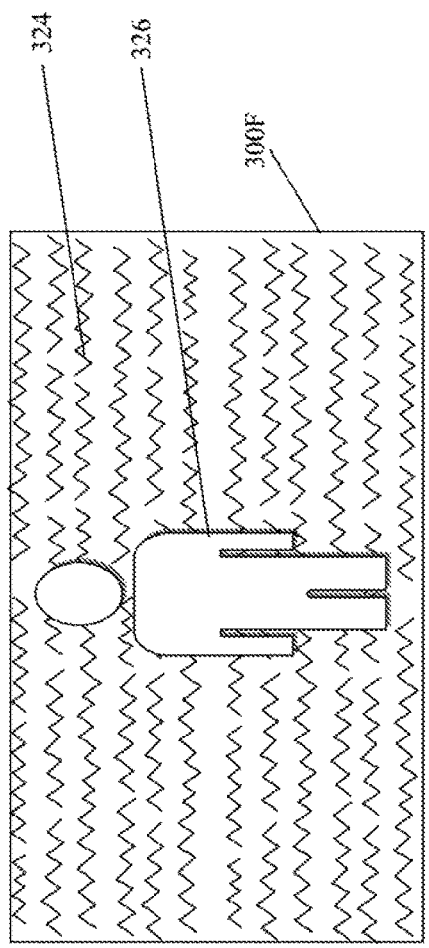
FIG. 3F illustrates a fifth exemplary scenario for implementation of the disclosed image-capture device and method for dynamic generation of an image of a scene based on removal of an undesired object that overlaps with a text background in the scene, in accordance with an embodiment of the disclosure.

FIG. 3F illustrates an exemplary scenario for implementation of the disclosed image-capture device and method to dynamically generate an image of a scene by removal of an undesired object that overlaps with a text background in the scene, in accordance with an embodiment of the disclosure. FIG. 3F is described in conjunction with elements from FIGS. 1 and 2.

With reference to FIG. 3F, there is shown an exemplary scene, such as the scene 300F to be captured by the image-capture device 102 (FIG. 1). The scene 300F comprises a text background 324 and an object 326. The object 326 (e.g., a human being) may be standing in front of the text background 324, as shown. Further, the text background 324 may be detected as a desired object and the object 326 (e.g., the standing boy) may be detected as an undesired object based on input by the user 112 of the image-capture device 102. With reference to FIG. 3F, there is further shown that certain text containing area is partially visible in the text background 324 and certain other text containing area is hidden as viewed in the first preview of the scene 300F. In such a scenario, after removal of the undesired object (i.e., the object 326) from a first preview of the scene 300F, the image processor 202 may fill a portion of the first preview of the scene 300E that corresponds to the removed undesired object with one or more letters or a combinations of letters (e.g., a word). In some embodiments, when one or two alphabetical letters or less than a threshold percent, for example, 50-70 percent of alphabetical letters, of one or more words in the text background 324 are missing, the image processor 202 may be configured to predict the missing letters of the one or more words. Based on the predicted letters, the portion of the text background 324 may be filled. In some embodiments, when more than one word is missing, the image processor 202 may be configured to execute a search over a database of words to find similar context, and if found, the portion is filled with the found words. In some embodiments, when the similar context is not found, the image processor 202 may discard the text in the overlapped region. In such a case, the text background corresponding to the overlapped region may be generated based on neighboring pixels in the text background 324. In some embodiments, during prediction of a text portion, previously learnt machine learning model may be utilized to appropriately fill a text region that refers to the text background corresponding to the overlapped region.

Figure 3G:
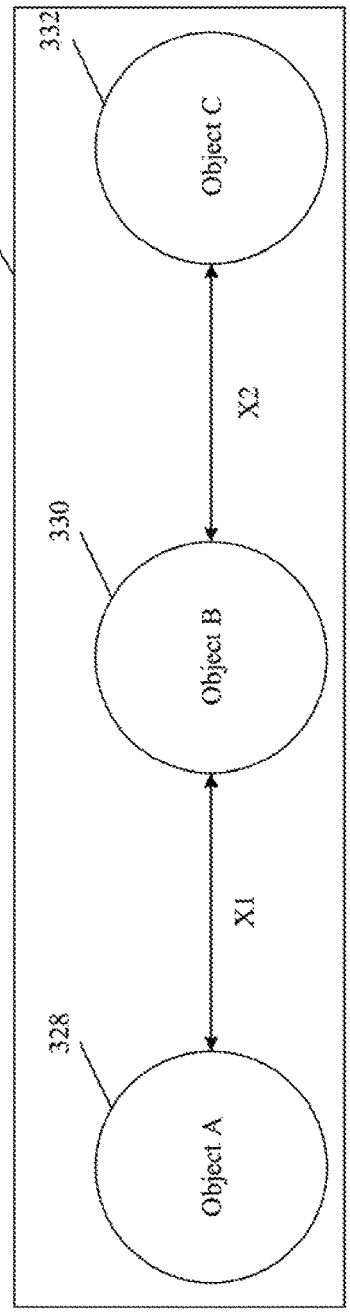
FIG. 3G illustrates a sixth exemplary scenario for implementation of the disclosed image-capture device and method for dynamic generation of an image of a scene by reduction of a distance between two desired objects in the scene, in accordance with an embodiment of the disclosure.

FIG. 3G illustrates an exemplary scenario for implementation of the disclosed image-capture device and method to dynamically generate an image of a scene by reduction of a distance between two desired objects in the scene, in accordance with an embodiment of the disclosure. FIG. 3G is described in conjunction with elements from FIGS. 1 and 2.

With reference to FIG. 3G, there is shown an exemplary scene, such as the scene 300G to be captured by the image-capture device 102 (FIG. 1). The scene 300G comprises three objects 328, 330, and 332. The objects 328 and 332 may be detected as desired objects and the object 330 may be detected as an undesired object based on a received input selection by the user 112 of the image-capture device 102 in the object selection mode. Further, the undesired object (i.e., the object 330) may lie in between the desired objects (i.e., the objects 328 and 332), such that the object 330 is at a distance of "X1" from the object 328 and at a distance of "X2" from the object 332. Based on the distance "X1" and "X2", the image processor 202 may reduce the distance between the objects 328 and 332 after removal of the undesired object (i.e., the object 330) from a first preview of the scene 300G. For example, if the objects 328 and 332 are separated by the distance "X" (=X1+X2) after the removal of the undesired object (i.e., the object 330), then the image processor 202 may control the reduction of the distance between the objects 328 and 332 based on an object-wise optical zoom-in factor ("Z"), such that the distance between the objects 328 and 332 is less than "X". For example, for a zoom-in ratio of 1.25×, the distance between the objects 328 and 332 may be reduced up to "0.75*X". Similarly, for the zoom-in ratio of 1.5× and 1.75×, the distance between the objects 328 and 332 may be reduced up to "0.5X" and "0.25*X", respectively.

In accordance with an embodiment, after the removal of the undesired object (such as the object 330) located between the two desired objects (e.g. the objects 328 and 332) in the first preview of the scene 300G, the user 112 may provide a touch input to change the position of the two desired objects (e.g. the objects 328 and 332). For example, the user 112 may select the two desired objects (e.g. the objects 328 and 332) by placing two fingers on the two desired objects (e.g. the objects 328 and 332) and may drag them closer to each other in the first preview. The image-capture device 102 may be configured to reduce a distance between two desired objects in the first preview of the scene 300G based on the received user input.

FIGS. 4A, 4B, 4C and 4D, collectively, depicts a flow chart that illustrates exemplary operations to dynamically generate an image of a scene by removal of an undesired object from the scene, in accordance with an embodiment of the disclosure. With reference to FIGS. 4A, 4B, 4C and 4D, there is shown a flow chart 400. The flow chart 400 is described in conjunction with, for example, FIGS. 1, 2, and 3A to 3G. The method starts at 402 and proceeds to 404.

At 404, an application interface comprising a first preview of a scene (e.g., the scene 108) to be captured may be rendered on the image-capture device 102. The display 104 may be configured to render the application interface comprising the first preview of the scene to be captured by the image-capture device 102.

At 406, the scene (e.g., the scene 108) to be captured by the image-capture device 102 may be focused. The user 112 of the image-capture device 102 may focus on the scene 108, for example, focus on a certain object or background of the scene based on an optical zoom adjustment, or adjustment of a position and an orientation of the image-capture device 102 to capture the scene 108. The scene may comprise one or more objects and a background.

Figure 4A:
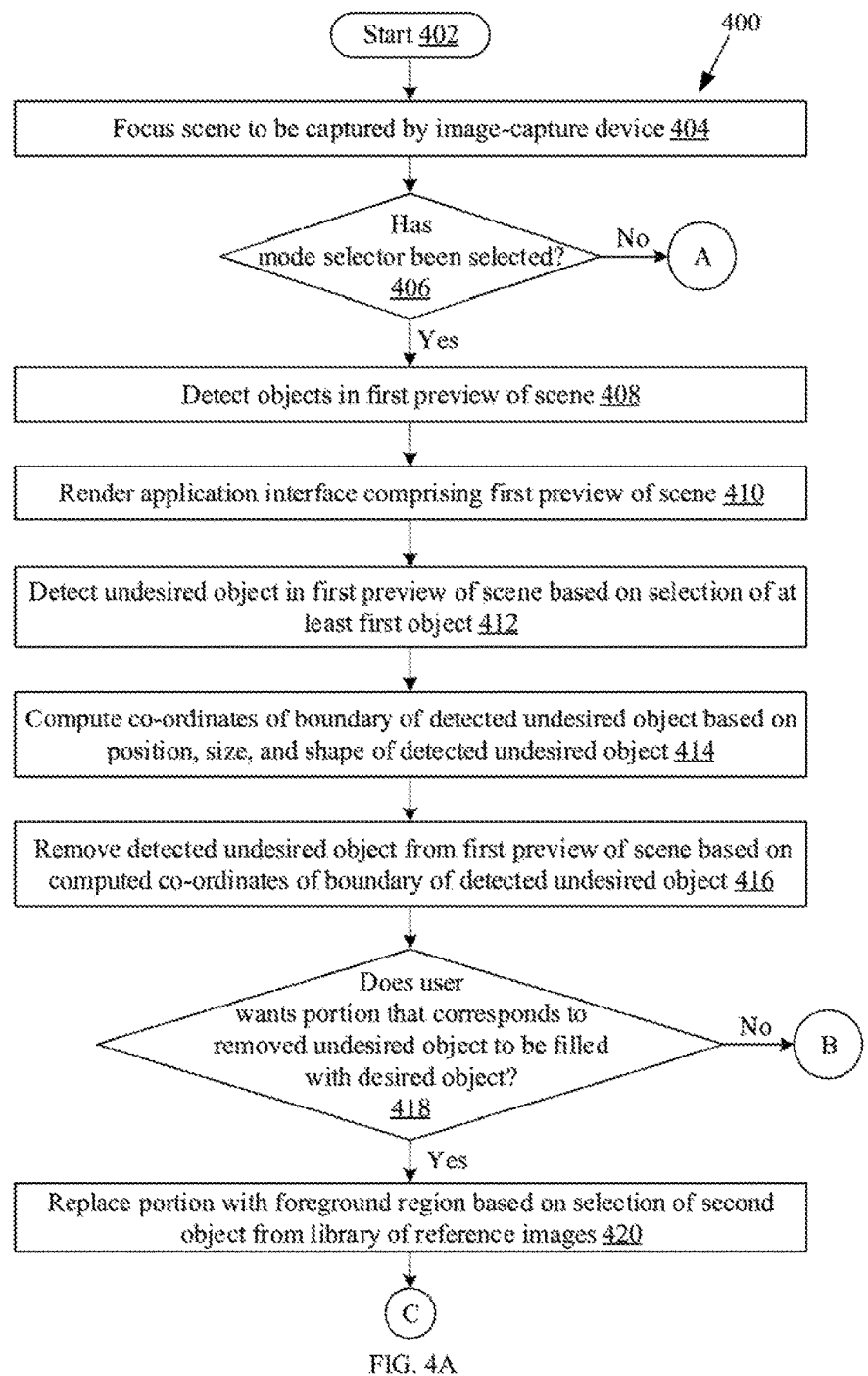
FIGS. 4A, 4B, 4C and 4D, collectively, depicts a flow chart that illustrates exemplary operations for dynamic generation of an image of a scene based on removal of an undesired object present in the scene, in accordance with an embodiment of the disclosure.
Figure 4B:
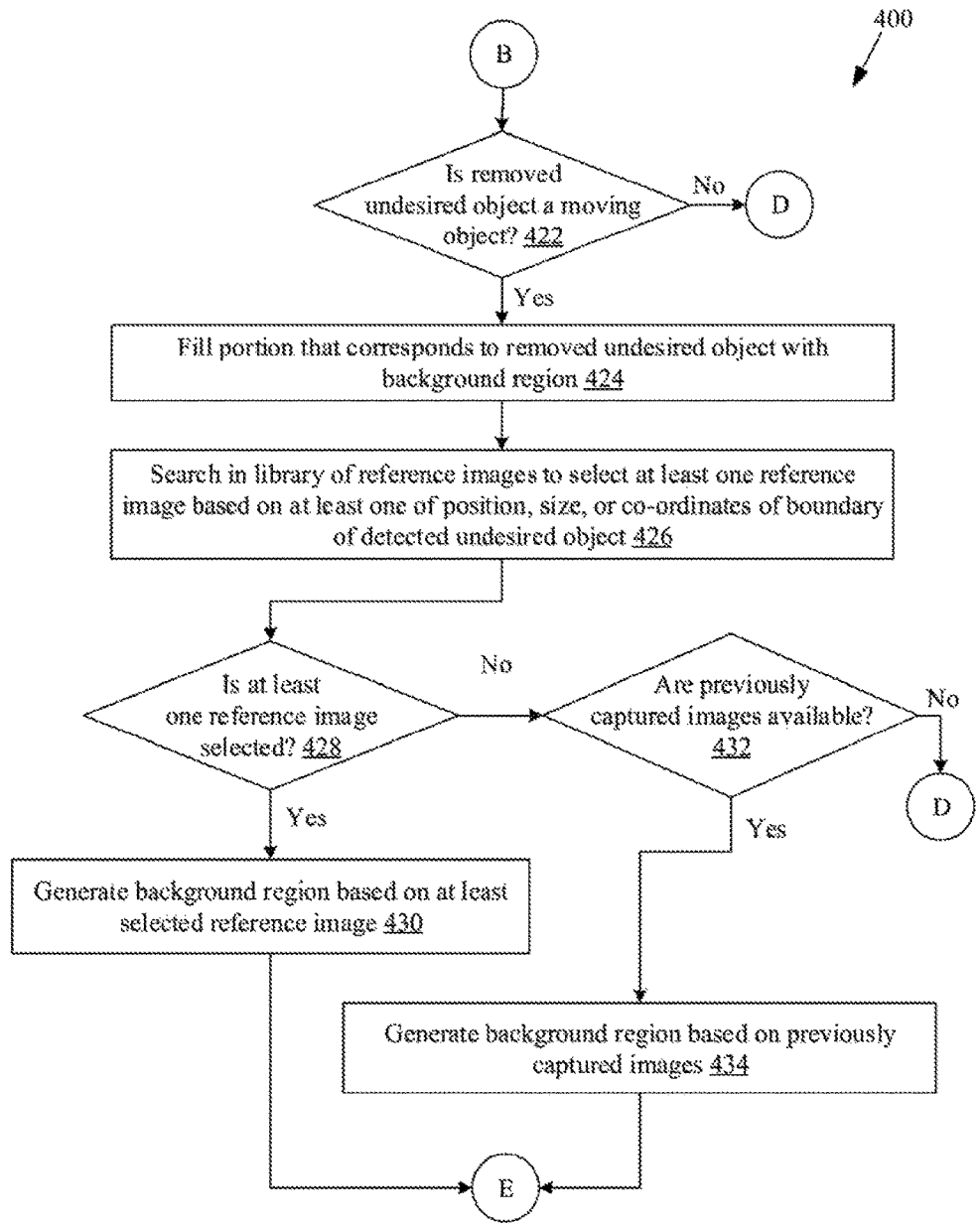
Figure 4C:
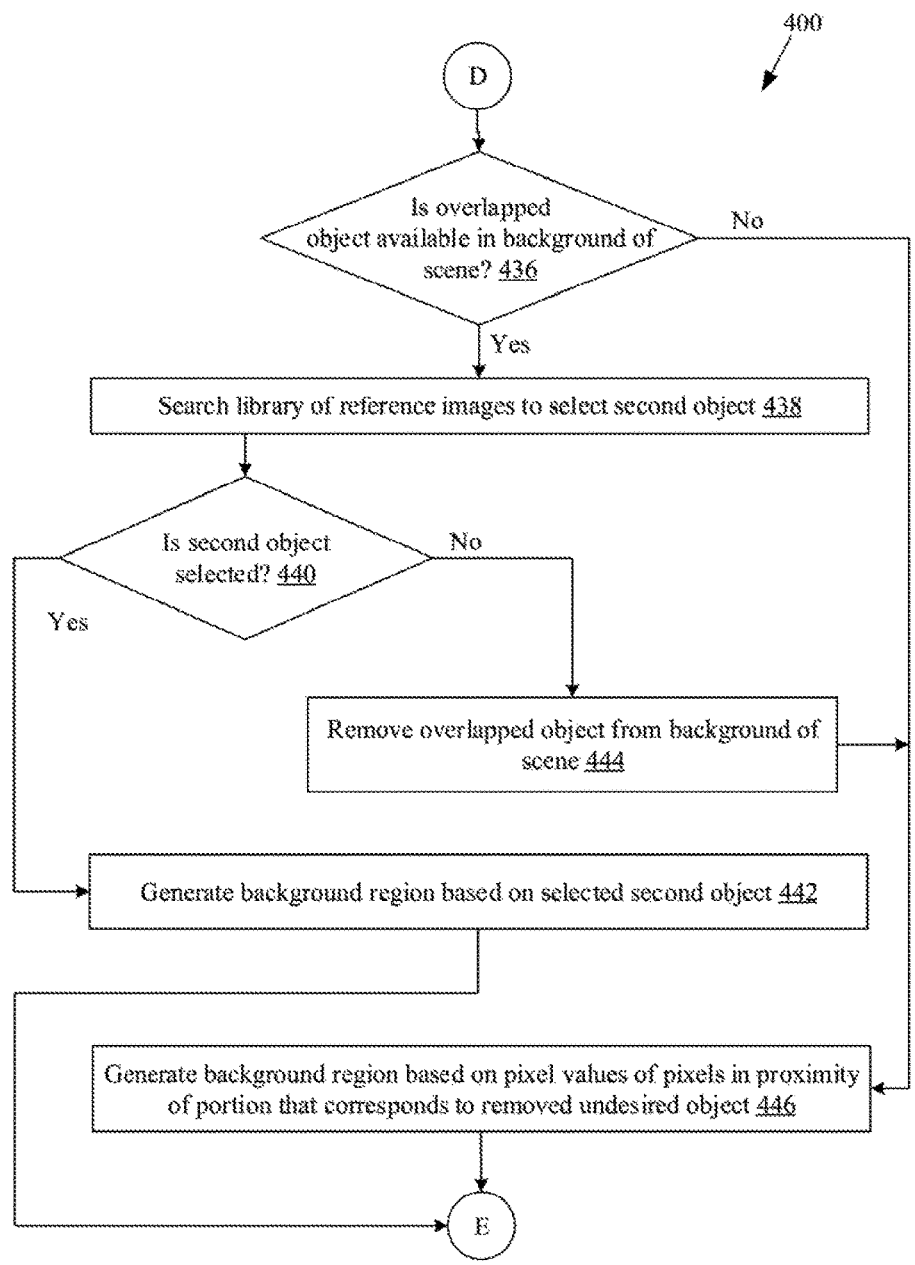
Figure 4D:
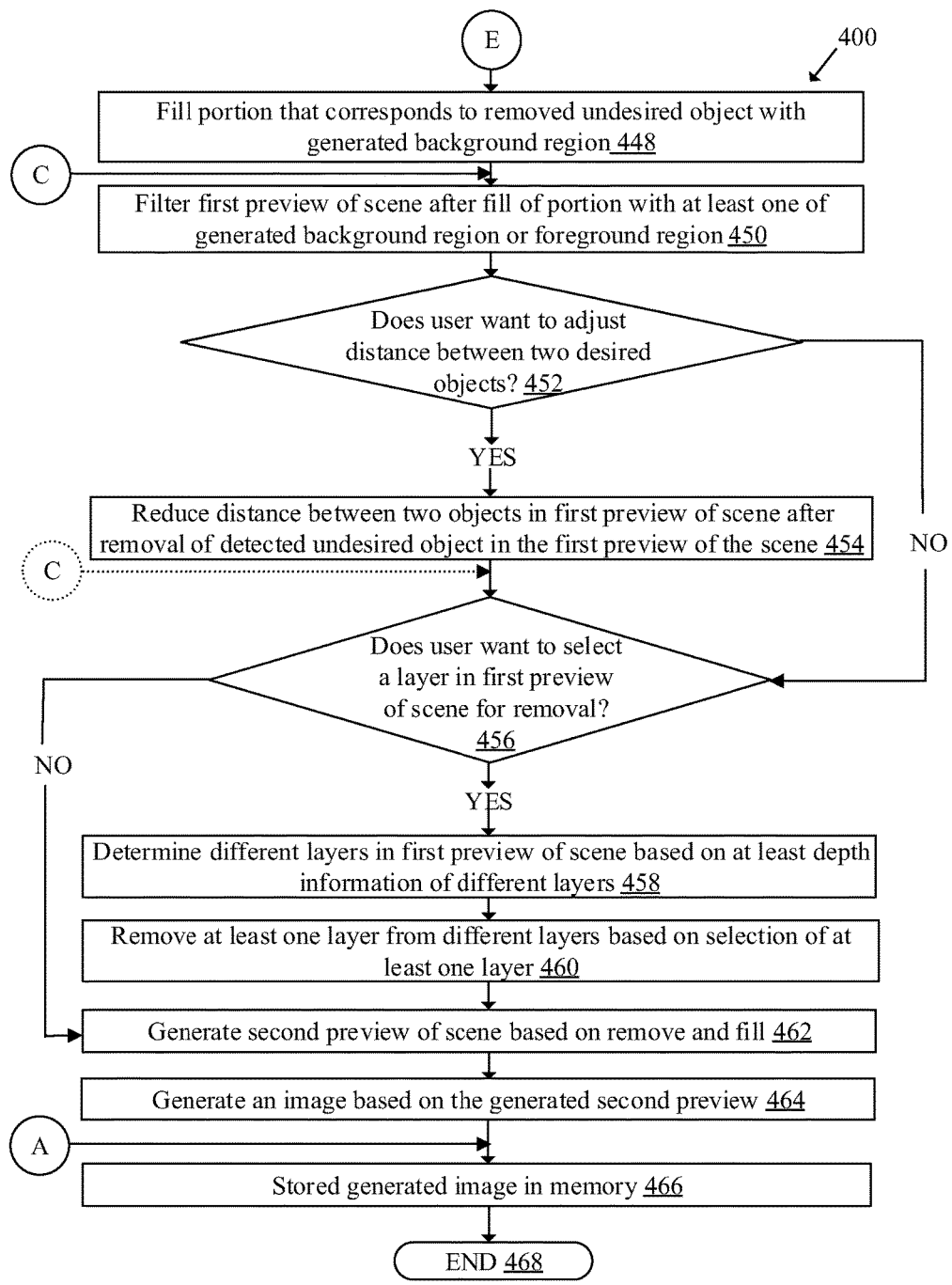

At 408, it may be determined whether an object selection mode is selected via the application interface. The image processor 202 may be configured to perform a check to determine whether the object selection mode is selected or not by use of the mode selector 204. In cases where the object selection mode is selected, the control may pass to 410, else may pass to 462 (FIG. 4D). A non-selection of the object selection mode indicates the user 112 may want to capture an image of the scene in a standard camera mode. Thus, in such a case, the image-capture device 102 may directly capture an image of the scene 108. In some embodiments, a user prompt may be generated and displayed on the application interface to remind the user 112 to select the object selection mode.

At 410, one or more objects in the first preview of the scene may be detected. The object detector 206 may be configured to detect the objects, for example, the first object 110, in the first preview of the scene. In some embodiments, after detection of the one or more objects in the first preview of the scene, the object detector 206 may be configured to highlight the one or more objects in the first preview.

At 412, an undesired object may be detected in the first preview of the scene based on a selection of an object (e.g. the first object 110). For example, the user 112 may double tap on an object in the first preview of the scene rendered on the display 104 to select the object as the undesired object. Similarly, the user 112 may single tap on other objects, if present, in the first preview of the scene to select the other objects as desired objects. The object selector 210 may select an object in the first preview as undesired object based on at least one of a touch-based input, a voice-based input, or a text-based input provided by the user, via the I/O device 208.

At 414, coordinates of a boundary of the detected undesired object (e.g., the first object 110) may be computed. The image processor 202 may be configured to compute the coordinates of the boundary of the detected undesired object based on a position, a size, and a shape of the detected undesired object.

At 416, the detected undesired object (e.g., the first object 110) may be removed from the first preview of the scene 108. The image processor 202 may be configured to remove the detected undesired object (e.g., the first object 110) from the first preview of the scene 108 based on the computed coordinates of the boundary of the detected undesired object.

At 418, it may be determined whether a user, such as the user 112, wants a portion of the first preview of the scene 108 that corresponds to the removed undesired object (e.g., the first object 110) to be replaced with a desired object. The image processor 202 may be configured to perform a check to determine whether the user wants the portion to be filled with the desired object. The check may be performed based on an input provided by the user, via the I/O device 208, to select a second object from the library of reference images stored in the memory 106 or the cloud server. The second object refers to a user selected desired object (such as a friend or known entity) that the user wants to be included in an image of the scene that is to be captured. The second object further refers to an entity which is not actually present in the scene to be captured as viewed in the first preview. In cases, where the user wants the portion to be replaced with the desired object (e.g., the second object), control passes to 420, else the control passes to 422.

At 420, the portion of the first preview of the scene 108 that corresponds to the removed undesired object (e.g., the first object 110) may be replaced with a foreground region. The image processor 202 may be configured to replace the portion with the foreground region based on the selection of the second object from the library of reference images stored in the memory 106 (or the cloud server). The object selector 210 may be configured to select the second object from the library of reference images based on an input provided by the user, via the I/O device 208, to select the second object from the library of reference images as the desired object. Control passes to 450. In some embodiments, the control pass to 456 after 420, where filtering is not required.

At 422, it may be determined whether the removed undesired object (e.g., the first object 110) is a moving object. The image processor 202 may be configured to perform a check to determine whether the removed undesired object (e.g., the first object 110) is the moving object or a static object. In cases, where the undesired object (e.g., the first object 110) is the moving object, control passes to 424, else the control passes to 436.

At 424, the portion of the first preview of the scene 108 that corresponds to the removed undesired object (e.g., the first object 110) may be filled with a background region. The image processor 202 may be configured to activate a burst mode to fill portion the portion with the background region from a set of images taken in the burst mode. In some embodiments, the generation of the background region for various scenarios has been described though 426 to 446.

At 426, at least one reference image may be selected based on a search in the library of reference images. The image processor 202 be configured to search the library of reference images based on the position, the size, or the coordinates of the boundary of the detected undesired object (e.g., the first object 110). In some embodiments, the library of reference images may also include the set of images taken in the burst mode.

At 428, it may be determined whether at least one reference image is selected. The image processor 202 may be configured to perform a check to determine the selection of the reference image based on the search of the library of reference images. In cases, where the reference image has been selected, control passes to 430, else the control passes to 432.

At 430, the background region for the portion of the first preview of the scene that corresponds to the removed undesired object in the first preview of the scene, may be generated. The image processor 202 may be configured to generate the background region based on at least one reference image selected from the library of reference images. Control passes to 448.

At 432, it may be determined whether previously captured images for the scene to be captured, are available. The image processor 202 may be configured to perform a check to determine the availability of the previously captured images in the memory 106. In some embodiments, the previously captured images may include the set of images taken in the burst mode. In cases, where the previously captured images are available, control passes to 434, else the control passes to 436.

At 434, the background region for the portion of the first preview of the scene may be generated based on the previously captured images. The image processor 202 may be configured to generate the background region based on the previously captured images. The previously captured images may correspond to images of the same scene captured by the same user, such as the user 112, at a certain time (e.g. a few moments back) prior to the viewing of the first preview at the image-capture device 102 under same or similar lighting conditions. The previously captured images may correspond to images from video stream rendered as the first preview. As the object is a moving object, the background region may be viewable in certain images frames as the object present in the scene moves while the scene is viewed in the first preview through the image-capture device 102. The background region may then be extracted from the image(s) of a video stream of the first preview where a presence of the same background region is detected. Control passes to 448.

At 436, it may be determined whether the portion that corresponds to the removed undesired object in the first preview overlaps with another object in the first preview. The other object may be referred to as overlapped object that is located or partially hidden behind the undesired object in the scene at the time of capture of the scene. The image processor 202 may be configured to check whether there is an overlapped object in background of the undesired object as detected by a shape coder of the object detector 206. In cases where, the portion that corresponds to the removed undesired object in the first preview overlaps with another object in the first preview, the control passes to 438, else the control passes to 446.

At 438, a visible region of the overlapped object may be utilized to search for a similar object in the library of reference images. The image processor 202 may be configured to utilize a visible region of the overlapped object to search for a similar object in the library of reference images.

At 440, it may be ascertained whether a matching object for the visible region of the overlapped object is found in the library of reference images. The image processor 202 may be configured to ascertain whether a matching object is found in the library of reference images. In cases where the matching object is found, the control to 442, else the control passes to 444.

At 442, a missing region of the overlapped object may be created from the most closely matching image reference. The image processor 202 may be configured to create the missing region of the overlapped object from the most closely matching image reference. An image filter may be applied on the overlapped object (a partial area in the whole image) for smooth blend of the missing region with the overlapped object smooth such that the entire overlapped object after creation appears contiguous and real with respect to parameters, such as luminance, chrominance, and overall texture. Control passes to 448.

At 444, the image processor 202 may remove the overlapped object from the background of the first preview of the scene 108. The overlapped object may be removed from the first preview of the scene in cases where the matching object is not found in the library of reference images. An example of the creation of missing regions of the overlapped object in the first preview has been shown and described, for example, in FIG. 3E.

At 446, the background region may be generated based on pixel values of pixels within proximity of the portion of the first preview of the scene 108 that corresponds to the removed undesired object (e.g., the first object 110). The image processor 202 may be configured to generate the background region. An example of the generation of the background region based on the pixel values of the pixels within proximity of the portion has been shown and described, for example, in FIGS. 3C and 3D.

At 448, the portion of the first preview of the scene 108 that corresponds to the removed undesired object (e.g., the first object 110) may be filled with the generated background region. The image processor 202 may be configured to fill the portion with the generated background or foreground region.

At 450, the first preview of the scene may filtered after the fill of the portion with at least one of the generated background region or foreground region. The image processor 202 may be configured to execute a filter process to remove artifacts that may have developed during the fill of the portion. The filter process may correspond to a low-pass interpolation filter process.

At 452, a first user-prompt may be generated to receive a user input to check whether a user wants to adjust distance between two desired objects. In cases where the user input confirms that the user wants to adjust distance between two desired objects, the control passes to 454, else to 456.

At 454, a distance between two objects of at least three objects in the first preview of the scene may be reduced after the removal of the detected undesired object from the at least three objects in the first preview of the scene 108 based on the received user input. For example, based on a presence of the at least three objects in the first preview of the scene 108 to be captured by the image-capture device 102, the image processor 202 may be configured to reduce the distance between the two objects after the removal of the detected undesired object from the at least three objects. The distance between the two objects may be reduced based on input provided by the user, via the I/O device 208, to reduce the distance. The image processor 202 may further reduce the distance between the two objects based on an object-wise optical zoom-in of the at least two objects. An example of the reduction of the distance between the two objects has been shown and described, for example, in FIG. 3G.

At 456, a second user-prompt may be generated to receive a user input to check whether a user wants to select a layer in the first preview of the scene 108 for removal. In cases where the user input confirms that the user wants to remove a layer, the control passes to 458, else to 462.

At 458, different layers in the first preview of the scene 108 may be determined. The image processor 202 may be configured to determine the different layers based on at least depth information associated with the objects or background of a scene, such as the scene 108, to be captured.

At 460, at least one layer from the different layers may be removed. The image processor 202 may be configured to remove the at least one layer from the different layers based on input provided by the user, via the I/O device 208, to remove the at least one layer.

At 462, the image processor 202 may generate a second preview of the scene 108. The second preview of the scene 108 may be generated based on the remove and the fill. The display 104 may be further configured to control display of the generated second preview of the scene on the application interface.

At 464, an image is generated based on the generated second preview. The image processor 202 may be configured to capture and generate the image based on the generated second preview of the scene 108. At 466, the image is stored in the memory 106. The image processor 202 may store the image in the memory 106. The control passes to the end 468.

In accordance with an embodiment of the disclosure, an image-capture device to dynamically generate an image of a scene based on removal of an undesired object in the scene is disclosed. The image-capture device 102 (shown in FIG. 1), may comprise a display 104 (shown in FIG. 1) and circuitry. The circuitry may correspond to, for example, the image processor 202, the mode selector 204, the object detector 206, the I/O device 208, and the object selector 210 (shown in FIG. 2). The display 104 may be configured to render an application interface comprising a first preview of the scene 108 to be captured by the image-capture device 102. The first preview of the scene 108 may comprise at least a first object 110. The circuitry may be configured to detect an undesired object in the preview of the scene 108. The undesired object may be detected based on a selection of the first object 110 in the preview of the scene 108. The circuitry may be further configured to remove the detected undesired object from the first preview of the scene 108. The circuitry may be further configured to fill a portion of the first preview of the scene 108 that corresponds to the removed undesired object in the first preview of the scene 108. The portion may be filled with at least one of a background region or a foreground region. The circuitry may be further configured to generate a second preview of the scene 108 based on the remove and the fill. The circuitry may be further configured to generate an image of the scene 108 based on the generated second preview.

The image-capture device 102 may find application in digital cameras and smart electronic devices, for example, a smart phone having a camera to provide a selective capture ability for dynamic generation of a desired image of a scene based on removal of an undesired object (e.g., the first object 110) from the scene. The user 112 of the image-capture device 102 may focus the image-capture device 102 on the scene that may include one or more undesired objects (e.g., the first object 110) that the user may not want to be in the image of the scene. By turning "ON" the object selection mode, the selective capture functionality is turned "ON" by the object mode selector 204) of the image-capture device 102, where the user 112 may select the one or more undesired objects to be removed before an actual capture of the image of the scene. The image-capture device 102 may remove the one or more undesired objects (e.g., the first object 110) from the scene. Further, a portion that corresponds to the removed one or more undesired objects may be filled with at least one of a foreground region or a background region. Based on the remove and the fill during the capture of the scene 108, the image of the scene 108 may be generated that does not include the one or more undesired objects. Thus, in comparison to a conventional camera device that captures all objects including the desired objects and the undesired objects that come within the camera view angle of the camera device, the image-capture device 102 may selectively capture an image of the scene that includes only the desired objects. Thus, the user 112 may not need to crop the captured image or post-process the captured image to discard the undesired objects. Hence, the dependency on other software or hardware to perform cropping or post processing may be eliminated, resulting in saving of time for the user 112 and providing an ability of selective capture of an actual real-world scene. The image-capture device 102 further provides an option to discard a still object from a frame of the scene as viewed in the first preview, such as a live preview of the scene. The image-capture device 102 further provides an option to insert a desired object, such as a segmented body of a friend, from pre-stored image library in real time or near-real time. Thus, even if the person is not present in the scene, the captured image of the scene may include the person based on the selected of the person's photo from pre-stored library during the capture of the scene. The selective capture functionality of the image-capture device 102 provides an ability to the image-capture device 102 to focus on a particular person(s) (desired object) and discard other unknown people or unwanted objects (undesired object) in the same frame, while capturing image/video. Further, a voice based guide for object selection/removal is provided, when there are multiple objects of same type. For example, the user 112 may speak a name of the person to select the desired objects or undesired object as per defined settings. For still objects, where background may not be available, pixels of nearby coordinates may be used to fill (or replace) the removed portion that corresponds to the undesired object, as described. Further, a search in the reference library of images based on position and size of the undesired object, may also be done to find a closest match and use the reference image to replace the removed portion with a foreground or background region that blends well with remaining portion of the background.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for dynamically generating an image of a scene based on removal of an undesired object in the scene. The at least one code section may cause the machine and/or computer to perform the operations that comprise rendering an application interface comprising a first preview of the scene 108 to be captured by an image-capture device 102. The first preview of the scene comprises at least the first object 110. The at least one code section in the image-capture device 102 may cause the machine and/or computer to perform the operations that comprise detecting an undesired object in the preview of the scene 108 based on a selection of the first object 110. The at least one code section in the image-capture device 102 may cause the machine and/or computer to perform the operations that further comprise removing the detected undesired object from the first preview of the scene 108. The at least one code section in the image-capture device 102 may cause the machine and/or computer to perform the operations that further comprise filling a portion of the first preview of the scene 108 that corresponds to the removed undesired object in the first preview of the scene 108 with at least one of a background region or a foreground region. The at least one code section in the image-capture device 102 may cause the machine and/or computer to perform the operations that further comprise generating a second preview of the scene 108 based on the remove and the fill. The at least one code section in the image-capture device 102 may cause the machine and/or computer to perform the operations that further comprise generating an image of the scene 108 based on the generated second preview.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An image-capture device, comprising:
    a display configured to render an application interface comprising a first preview of a scene to be captured by the image-capture device, wherein the first preview of the scene comprises a first object, a second object, and a third object; and
    circuitry configured to:
        detect an undesired object, as the first object, in the first preview of the scene based on a selection of the first object;
        remove the detected undesired object from the first preview of the scene;
        fill a portion of the first preview of the scene with at least one of a background region or a foreground region, wherein the portion of the first preview corresponds to the removed undesired object;
        reduce a distance between the second object and the third object in the first preview of the scene;
        generate a second preview of the scene based on the removal, the fill, and the reduction; and
        generate an image of the scene based on the generated second preview.

2. The image-capture device according to claim 1, wherein the selection of the first object is based on a voice-based input.

3. The image-capture device according to claim 1, wherein the selection of the first object is based on at least one of a touch-based input, a voice-based input, or a text-based input.

4. The image-capture device according to claim 1, wherein the circuitry is further configured to compute coordinates of a boundary of the detected undesired object based on a position, a size, and a shape of the detected undesired object.

5. The image-capture device according to claim 4, wherein the circuitry is further configured to remove the detected undesired object from the first preview of the scene based on the computed coordinates of the boundary of the detected undesired object.

6. The image-capture device according to claim 1, further comprising a memory configured to store a library of reference images, wherein the circuitry is further configured to:
    search for at least one reference image in the library of reference images stored in at least one of the memory or a cloud server that is communicatively coupled to the image-capture device, wherein the search is based on at least one of a position, a size, or coordinates of a boundary of the detected undesired object;
    select the at least one reference image from the library of reference images; and
    generate the background region based on the selected at least one reference image.

7. The image-capture device according to claim 1, wherein the circuitry is further configured to generate the background region based on pixel values of pixels, and wherein the pixels are within a proximity of the portion.

8. The image-capture device according to claim 1, wherein the circuitry is further configured to:
    capture a plurality of images prior to the first preview of the scene; and
    generate the background region based on at least one of the plurality of images.

9. The image-capture device according to claim 1, further comprising a memory configured to store a library of reference images, wherein the circuitry is further configured to:
    replace the portion with the foreground region based on a selection of a fourth object from the library of reference images stored in at least one of the memory or a cloud server.

10. The image-capture device according to claim 1, wherein the circuitry is further configured to reduce the distance subsequent to the removal of the detected undesired object in the first preview of the scene.

11. The image-capture device according to claim 10, wherein the circuitry is further configured to reduce the distance based on a distance value.

12. The image-capture device according to claim 11, wherein the circuitry is further configured to reduce the distance based on at least an object-wise optical zoom-in of each of the second object and the third object.

13. The image-capture device according to claim 1, wherein the circuitry is further configured to determine different layers in the first preview of the scene based on at least depth information of the different layers.

14. The image-capture device according to claim 13, wherein the circuitry is further configured to remove at least one layer from the different layers based on a selection of the at least one layer.

15. An image-capture method, comprising:
    rendering, by a display, an application interface comprising a first preview of a scene to be captured by an image-capture device, wherein the first preview of the scene comprises a first object, a second object, and a third object;
    detecting, by circuitry, an undesired object, as the first object, in the first preview of the scene based on a selection of the first object;
    removing, by the circuitry, the detected undesired object from the first preview of the scene;
    filling, by the circuitry, a portion of the first preview of the scene with at least one of a background region or a foreground region, wherein the portion of the first preview corresponds to the removed undesired object;
    reducing, by the circuitry, a distance between the second object and the third object in the first preview of the scene;
    generating, by the circuitry, a second preview of the scene based on the removal, the fill, and the reduction; and
    generating, by the circuitry, an image of the scene based on the generated second preview.

16. The image-capture method according to claim 15, further comprising removing, by the circuitry, the detected undesired object from the first preview of the scene based on coordinates of a boundary of the detected undesired object.

17. The image-capture method according to claim 15, further comprising generating, by the circuitry, the background region based on pixel values of pixels, wherein the pixels are within a proximity of the portion.

18. The image-capture method according to claim 15, further comprising replacing, by the circuitry, the portion with the foreground region based on a selection of a fourth object from a library of reference images, wherein the library of reference images is stored in at least one of a memory of the image-capture device or a cloud server that is communicatively coupled to the image-capture device.

19. The image-capture method according to claim 15, further comprising reducing, by the circuitry, the distance subsequent to the removal of the detected undesired object in the first preview of the scene.

20. The image-capture method according to claim 15, further comprising determining, by the circuitry, different layers in the first preview of the scene based on at least depth information of the different layers.

21. The image-capture method according to claim 20, further comprising removing, by the circuitry, at least one layer from the different layers based on a selection of the at least one layer.

22. The image-capture method according to claim 15, further comprising:
   detecting, by the circuitry, the removed undesired object is a moving object;
   activating, by the circuitry, a burst mode based on the detection of the removed undesired object;
   capturing, by the circuitry, a set of images in the burst mode;
   generating, by the circuitry, the background region based on the set of images; and
   filling, by the circuitry, the portion of the first preview with the generated background region.

23. The image-capture method according to claim 15, further comprising executing, by the circuitry, a filter process to remove artifacts that are detected in a region that surrounds the portion, wherein the removal of the artifacts is subsequent to the filling of the portion with at least one of the background region or the foreground region.

24. An image-capture method, comprising:
   rendering, by a display, an application interface comprising a first preview of a scene to be captured by an image-capture device, wherein the first preview of the scene comprises a first object;
   detecting, by circuitry, an undesired object in the first preview of the scene based on a selection of the first object;
   removing, by the circuitry, the detected undesired object from the first preview of the scene;
   detecting, by the circuitry, the removed undesired object is a moving object;
   activating, by the circuitry, a burst mode based on the detection of the removed undesired object;
   capturing, by the circuitry, a set of images in the burst mode;
   generating, by the circuitry, a background region based on the set of images;
   filling, by the circuitry, a portion of the first preview of the scene with the generated background region, wherein the portion corresponds to the removed undesired object in the first preview of the scene;
   generating, by the circuitry, a second preview of the scene based on the removal and the fill; and
   generating, by the circuitry, an image of the scene based on the generated second preview.

* * * * *